(12) United States Patent
Staker et al.

(10) Patent No.: US 9,917,990 B2
(45) Date of Patent: *Mar. 13, 2018

(54) IMAGING SYSTEMS WITH MOVABLE SCAN MIRRORS

(71) Applicant: Complete Genomics, Inc., Mountain View, CA (US)

(72) Inventors: Bryan P. Staker, Mountain View, CA (US); Craig E. Uhrich, Mountain View, CA (US)

(73) Assignee: Complete Genomics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,959

(22) Filed: Apr. 10, 2017

(65) Prior Publication Data

US 2017/0289412 A1    Oct. 5, 2017

Related U.S. Application Data

(63) Continuation of application No. 13/907,801, filed on May 31, 2013, now Pat. No. 9,628,676.
(Continued)

(51) Int. Cl.
*H04N 7/18* (2006.01)
*G02B 21/36* (2006.01)
(Continued)

(52) U.S. Cl.
CPC .......... *H04N 5/2251* (2013.01); *G02B 21/16* (2013.01); *G02B 21/367* (2013.01); *G02B 27/646* (2013.01)

(58) Field of Classification Search
CPC .......... H01J 37/285; H01J 37/27; H01J 37/28; G02B 27/0031; G02B 23/2415; G02B 25/007
(Continued)

(56) References Cited

U.S. PATENT DOCUMENTS 3,706,848 A    12/1972  Rouet
4,174,159 A    11/1979  Kraft et al.
(Continued)

FOREIGN PATENT DOCUMENTS

CN    1461570    12/2003
CN    1700051    11/2005
(Continued)

OTHER PUBLICATIONS

U.S. Appl. No. 13/907,801, Advisory Action dated Apr. 29, 2016, 4 pages.
(Continued)

*Primary Examiner* — Xi Wang
(74) *Attorney, Agent, or Firm* — Kilpatrick Townsend & Stockton LLP

(57) ABSTRACT

An imaging system is provided wherein a positioning stage is translated with respect to an objective lens component and a scan mirror is repositioned while a two-dimensional image is made of a biochemical site on a substrate. In an example embodiment, an imaging system comprises a camera, an objective lens component, a positioning stage, and a scan mirror controllable by a servo system that synchronizes movement of the positioning stage and the tilting of the scan mirror so that the substrate image is maintained stable during imaging of the continuously moving positioning stage.

16 Claims, 8 Drawing Sheets

Related U.S. Application Data

(60) Provisional application No. 61/656,701, filed on Jun. 7, 2012, provisional application No. 61/656,774, filed on Jun. 7, 2012.

(51) Int. Cl.
*H04N 5/225* (2006.01)
*G02B 21/16* (2006.01)
*G02B 27/64* (2006.01)

(58) Field of Classification Search
USPC .............. 348/79, 87, 80; 396/432; 359/380
See application file for complete search history.

(56) References Cited

U.S. PATENT DOCUMENTS

| | | | |
|---|---|---|---|
| 4,302,087 A | 11/1981 | Reinheimer et al. | |
| 4,589,140 A | 5/1986 | Bishop et al. | |
| 4,683,195 A | 7/1987 | Mullis et al. | |
| 4,683,202 A | 7/1987 | Mullis | |
| 4,731,745 A | 3/1988 | Katagiri et al. | |
| 4,800,159 A | 1/1989 | Mullis et al. | |
| 4,883,750 A | 11/1989 | Whiteley et al. | |
| 4,965,188 A | 10/1990 | Mullis et al. | |
| 5,210,015 A | 5/1993 | Gelfand et al. | |
| 5,399,491 A | 3/1995 | Kacian et al. | |
| 5,476,930 A | 12/1995 | Letsinger et al. | |
| 5,593,826 A | 1/1997 | Fung et al. | |
| 5,854,033 A | 12/1998 | Lizardi | |
| 5,871,921 A | 2/1999 | Landegren et al. | |
| 5,990,479 A | 11/1999 | Weiss et al. | |
| 6,174,670 B1 | 1/2001 | Wittwer et al. | |
| 6,207,392 B1 | 3/2001 | Weiss et al. | |
| 6,210,891 B1 | 4/2001 | Nyren et al. | |
| 6,251,303 B1 | 6/2001 | Bawendi et al. | |
| 6,287,824 B1 | 9/2001 | Lizardi | |
| 6,309,824 B1 | 10/2001 | Drmanac | |
| 6,310,710 B1 | 10/2001 | Shahar et al. | |
| 6,319,426 B1 | 11/2001 | Bawendi et al. | |
| 6,322,901 B1 | 11/2001 | Bawendi et al. | |
| 6,396,995 B1 | 5/2002 | Stuelpnagel et al. | |
| 6,400,487 B1 | 6/2002 | Harris et al. | |
| 6,401,267 B1 | 6/2002 | Drmanac | |
| 6,423,551 B1 | 7/2002 | Weiss et al. | |
| 6,426,513 B1 | 7/2002 | Bawendi et al. | |
| 6,444,143 B2 | 9/2002 | Bawendi et al. | |
| 6,544,732 B1 | 4/2003 | Chee et al. | |
| 6,576,291 B2 | 6/2003 | Bawendi et al. | |
| 6,753,906 B2 | 6/2004 | Shimada | |
| 6,828,100 B1 | 12/2004 | Ronaghi | |
| 6,833,246 B2 | 12/2004 | Balasubramanian | |
| 6,864,052 B1 | 3/2005 | Drmanac et al. | |
| 6,891,610 B2 | 5/2005 | Nikoonahad et al. | |
| 6,911,345 B2 | 6/2005 | Quake et al. | |
| 7,070,927 B2 | 7/2006 | Drmanac | |
| 7,335,898 B2 | 2/2008 | Donders et al. | |
| 7,391,565 B2 | 6/2008 | Lauer | |
| 7,476,831 B2 | 1/2009 | Juskaitis et al. | |
| 7,586,682 B2 | 9/2009 | Ohtake et al. | |
| 7,714,996 B2 | 5/2010 | Yan et al. | |
| 7,782,528 B2* | 8/2010 | Fukuyama | G02B 21/24 |
| | | | 359/363 |
| 7,929,857 B2 | 4/2011 | Baldwin et al. | |
| 8,059,336 B2 | 11/2011 | Ptitsyn et al. | |
| 8,098,279 B2* | 1/2012 | Sase | G02B 21/361 |
| | | | 348/220.1 |
| 8,175,452 B1 | 5/2012 | Staker et al. | |
| 8,203,608 B2 | 6/2012 | Ziegenbein et al. | |
| 8,428,454 B2 | 4/2013 | Staker et al. | |
| 8,445,194 B2 | 5/2013 | Drmanac et al. | |
| 8,660,421 B2 | 2/2014 | Staker et al. | |
| 9,488,823 B2 | 11/2016 | Staker et al. | |
| 9,628,676 B2* | 4/2017 | Staker | H04N 5/2251 |
| 2002/0045045 A1 | 4/2002 | Adams et al. | |
| 2002/0164054 A1* | 11/2002 | McCartney | A61B 5/1176 |
| | | | 382/118 |
| 2003/0017264 A1 | 1/2003 | Treadway et al. | |
| 2003/0151742 A1 | 8/2003 | Silvermintz et al. | |
| 2004/0218191 A1 | 11/2004 | Farrell et al. | |
| 2004/0218263 A1* | 11/2004 | Brugal | G02B 21/002 |
| | | | 359/368 |
| 2005/0248837 A1 | 11/2005 | Sase et al. | |
| 2005/0270640 A1* | 12/2005 | Miki | G01N 21/6458 |
| | | | 359/381 |
| 2005/0280714 A1 | 12/2005 | Freeman | |
| 2006/0011804 A1 | 1/2006 | Engelmann et al. | |
| 2006/0024711 A1 | 2/2006 | Lapidus et al. | |
| 2006/0072191 A1 | 4/2006 | Akiyama et al. | |
| 2007/0002434 A1 | 1/2007 | Juskaitis et al. | |
| 2007/0069106 A1 | 3/2007 | Krief et al. | |
| 2007/0087362 A1 | 4/2007 | Church et al. | |
| 2007/0121107 A1 | 5/2007 | Tsai et al. | |
| 2007/0147673 A1 | 6/2007 | Crandall | |
| 2007/0207482 A1 | 9/2007 | Church et al. | |
| 2009/0072171 A1 | 3/2009 | So et al. | |
| 2009/0295963 A1 | 12/2009 | Bamford et al. | |
| 2010/0090127 A1 | 4/2010 | Yekta et al. | |
| 2010/0214653 A1 | 8/2010 | Pacholik et al. | |
| 2010/0259605 A1* | 10/2010 | So | G06K 9/00127 |
| | | | 348/79 |
| 2011/0115896 A1 | 5/2011 | Doehring et al. | |
| 2011/0249109 A1 | 10/2011 | Fine | |
| 2011/0292200 A1 | 12/2011 | Van Dijk et al. | |
| 2012/0002031 A1 | 1/2012 | Pertsinidis et al. | |
| 2012/0099852 A1* | 4/2012 | Staker | G02B 21/365 |
| | | | 396/432 |
| 2013/0093873 A1 | 4/2013 | Bula et al. | |
| 2014/0133011 A1* | 5/2014 | Schwedt | G02B 21/0032 |
| | | | 359/298 |
| 2014/0152793 A1 | 6/2014 | Staker et al. | |
| 2014/0152888 A1 | 6/2014 | Staker et al. | |
| 2015/0054921 A1 | 2/2015 | Dixon et al. | |
| 2017/0013220 A1 | 1/2017 | Staker et al. | |

FOREIGN PATENT DOCUMENTS

| | | |
|---|---|---|
| CN | 101764958 | 6/2010 |
| CN | 102246081 | 11/2011 |
| EP | 1808721 | 7/2007 |
| JP | 09250912 | 9/1997 |
| JP | 2000171719 | 6/2000 |
| JP | 2008507719 | 3/2008 |
| JP | 2009008603 | 1/2009 |
| JP | 2009171921 | 8/2009 |
| JP | 2009538697 | 11/2009 |
| WO | 01/84209 A2 | 11/2001 |
| WO | 0184209 | 11/2001 |
| WO | 2006008637 | 1/2006 |
| WO | 2007142960 | 12/2007 |
| WO | 2010070553 | 6/2010 |
| WO | 2012002893 | 1/2012 |
| WO | 2012058014 | 5/2012 |
| WO | 2012083438 | 6/2012 |
| WO | 2013184762 | 12/2013 |
| WO | 2013184758 | 1/2014 |

OTHER PUBLICATIONS

U.S. Appl. No. 13/907,801, Final Office Action dated Dec. 31, 2015, 16 pages.
U.S. Appl. No. 13/907,801, Final Office Action dated Nov. 3, 2016, 32 pages.
U.S. Appl. No. 13/907,801, Non-Final Office Action dated Apr. 29, 2015, 15 pages.
U.S. Appl. No. 13/907,801, Non-Final Office Action dated Jul. 7, 2016, 16 pages.
U.S. Appl. No. 13/907,801, Notice of Allowance dated Dec. 16, 2016, 15 pages.
U.S. Appl. No. 13/908,964, Non-Final Office Action dated May 23, 2016, 9 pages.

(56) References Cited

OTHER PUBLICATIONS

U.S. Appl. No. 13/908,964, Restriction Requirement dated Jan. 22, 2016, 5 pages.
Chinese Application No. 201380030227.4, Office Action dated Apr. 20, 2016, 8 pages.
Chinese Application No. 201380038130.8, Office Action dated Jul. 4, 2016, 7 pages.
European Application No. 13799902.5, Extended European Search Report dated Feb. 25, 2016, 7 pages.
European Application No. 13801133.3, Extended European Search Report dated Mar. 1, 2016, 6 pages.
International Application No. PCT/US2011/056211, International Preliminary Report on Patentability dated Feb. 27, 2014, 7 pages.
International Application No. PCT/US2011/056211, International Search Report and Written Opinion dated Apr. 17, 2012, 14 pages.
International Application No. PCT/US2013/044250, International Search Report and Written Opinion dated Nov. 20, 2013, 12 pages.
International Application No. PCT/US2013/044258, International Search Report and Written Opinion dated Oct. 16, 2013, 11 pages.

\* cited by examiner

IMAGING SYSTEMS WITH MOVABLE SCAN MIRRORS

PRIORITY INFORMATION

This application is a continuation of U.S. Application Ser. No. 13/907,801 filed May 31, 2013, which claims the priority benefit of U.S. Provisional Application No. 61/656,701, filed Jun. 7, 2012 and U.S. Provisional Application No. 61/656,774, filed Jun. 7, 2012. All applications are hereby incorporated herein by reference in their entirety for all purposes.

TECHNICAL FIELD

The present invention is generally related to imaging systems, and in particular to imaging systems for use in biochemical applications.

BACKGROUND

Obtaining useful data from images of biochemical experiments requires high spatial resolution, accuracy, and speed. Such images typically need to be obtained at high enough magnification for individual experiments to be clearly resolved. At the same time, the images need to cover a large enough field of view for experiments to be correctly identified. For large-scale studies, the imaging and image processing must take place quickly enough in order to be commercially feasible.

Step-and-repeat imagers and time-delay integration (TDI) imagers are two broad types of imaging systems that can be used to image biochemical experiments. Step-and-repeat systems can acquire about 10 megapixels of image data per second with about 5 μm alignment accuracy. TDI systems can acquire about 30 megapixels of image data per second with about 50 nm alignment accuracy. While for some applications these two types of systems may perform reasonably well, for other applications they suffer from some structural and functional disadvantages that adversely affect overall throughput. For example, applications involving large-scale biochemical experiment studies (e.g., such as massively parallel whole genome sequencing) typically require overall throughput that is higher than what step-and-repeat and TDI imaging systems can currently deliver.

What is needed is a scanning imaging system that is able to capture rapidly a large amount of detailed data.

SUMMARY

According to the invention, an imaging system is provided wherein a positioning stage is translated continuously with respect to an objective lens component and a scan mirror is repositioned synchronously with the positioning stage while an image is created of a biochemical site on a planar substrate. In an example embodiment, an imaging system comprises a 2D camera, an objective lens component, a positioning stage, and a scan mirror. The objective lens component is configured and operative to image a substrate (or a portion thereof) with the camera. The positioning stage is configured and operative to move the substrate in a specified direction with respect to the objective lens component while the camera is capturing 2D images. The scan mirror is configured and operative to move in coordination with the positioning stage, while the positioning stage moves the substrate in the same specified direction, in order to reflect light from the objective lens component to the camera. The imaging systems described here preserve the use of mechanically desirable continuous stage motion, but freeze the image of a substrate with respect to a camera's sensor array during image acquisition

DETAILED DESCRIPTION

Figure 1:
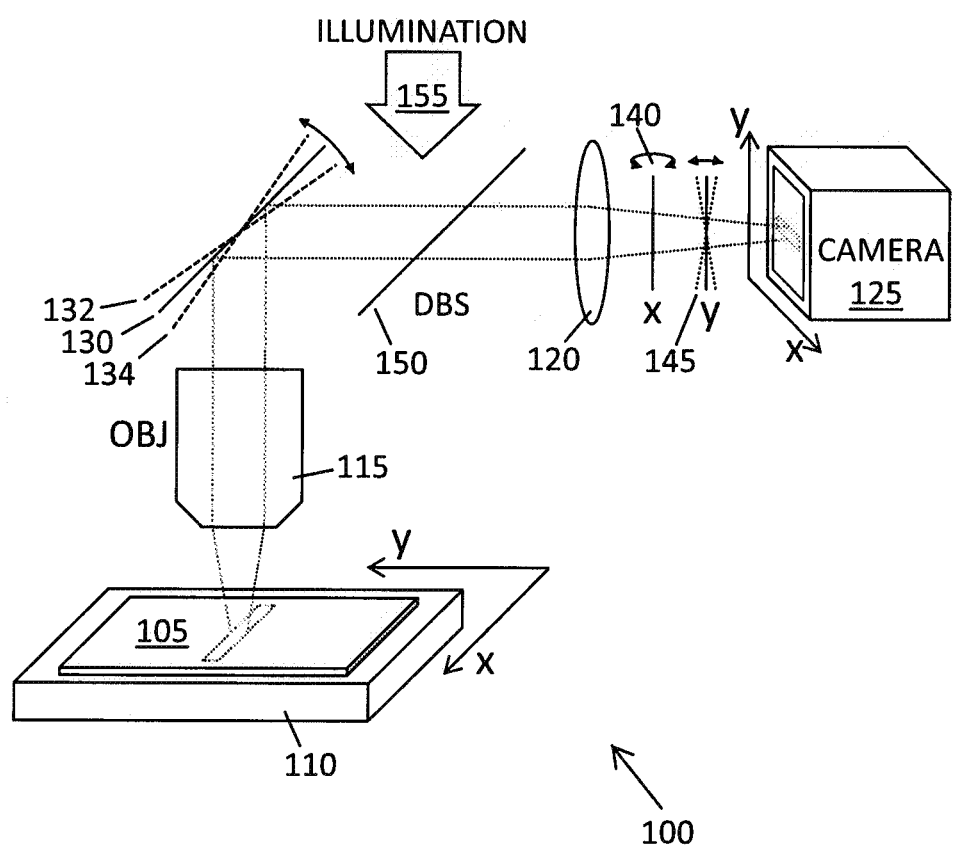
FIG. 1 is a block diagram of a representative scanning imaging system according to one embodiment.

In the present disclosure, numerous specific details are set forth to provide a more thorough understanding of the present invention. However, it will be apparent to one of skill in the art that the present invention may be practiced without one or more of these specific details. In other instances, well-known features and procedures well known to those skilled in the art have not been described in order to avoid obscuring the invention. The present disclosure describes embodiments of novel imaging systems and features thereof that may be used to conduct a variety of imaging and/or scanning operations such as, for example, operations used to observe and/or record biochemical experiments and other biochemical reactions.

Overview

In an example embodiment, an imaging system comprises a camera, an objective lens component, a positioning stage, and a scan mirror. For simplicity, the mechanical components controlling the positioning of the positioning stage and controlling the scanning of the scan mirror are not shown. However, it is understood that the positioning stage and scan mirror movements are coordinated through an appropriate servo control system. The objective lens component is configured and operative to image a substrate or a portion thereof onto the camera. The positioning stage is configured and operative to move the substrate in a particular direction with respect to the objective lens component, where in one aspect the particular direction is substantially normal to the optical axis of the objective lens component. The scan mirror is configured and operative to move, that is, tilt synchronously with the movement of the positioning stage, while the positioning stage moves the substrate in the specified particular direction, in order to reflect light from the objective lens component to the camera.

In an example embodiment, the scan mirror is configured and operative to perform an angular motion that allows the camera to acquire a still image of the substrate (or a portion thereof) while the substrate is being moved by the positioning stage.

In an example embodiment, the imaging system further comprises a tube lens component positioned in an optical path between the scan mirror and the camera, so that the scan mirror can direct the light from the objective lens component to the tube lens component.

In an example embodiment, the imaging system may further comprise a tilt plate positioned in an optical path between the scan mirror and the camera, where the tilt plate is configured and operative to cause offset corrections to an image of the substrate (or the portion thereof) that is acquired by the objective lens component. In one aspect, the imaging system further comprises a servo mechanism that is operatively coupled to the tilt plate and is operative to tilt the tilt plate in order to provide the offset corrections. In another aspect, the imaging system further comprises a second tilt plate positioned in the optical path between the scan mirror and the camera, where the second tilt plate is configured and operative to cause second offset corrections, in the image of the substrate or the portion thereof, in a direction that is perpendicular to the first offset corrections.

In an example embodiment, the imaging system further comprises an angle sensor that is configured and operative to measure an angle of the scan mirror. In one aspect, the angle sensor comprises an optical lever. In another aspect, angle sensor comprises a laser and a linear array detector, where the linear array detector is configured and operative to detect light from the laser that is reflected by the scan mirror.

In an example embodiment, the imaging system further comprises a light source and a dichroic mirror, where the dichroic mirror is configured and operative at least to: (a) reflect light from the light source to illuminate the substrate (or the portion thereof); and (b) pass through light that is acquired by the objective lens component.

In an example embodiment, the imaging system further comprises a servo mechanism that is operatively coupled to the scan mirror and is operative to angularly move the scan mirror in coordination with the positioning stage, while the positioning stage moves the substrate, in order to keep an image of the substrate (or the portion thereof) still with respect to the camera while the image is being acquired through the objective lens component.

In an example embodiment, the substrate comprises an array having target nucleic acids disposed thereon. In another embodiment, the substrate comprises a multitude of distinct features that are targets for imaging.

In an example embodiment, the imaging system comprises a full-frame camera such as, for example, a CMOS ("Complementary Metal-Oxide Semiconductor") camera. In one aspect, the camera has a number of camera pixels in a range from 100,000 pixels to 100 million pixels. In another aspect, the camera is configured to operate with readout efficiency in a range from 10% to 55%. In another aspect, the camera is configured to operate with a line rate in a range from 1,000 lines per second to 1,000,000 lines per second.

In an example embodiment, the imaging system comprises a positioning stage that is configured and operative to move the substrate with a velocity in a range from 100 μm/second to 1,000 mm/second.

In an example embodiment, a method for imaging a substrate (or a portion thereof) comprises the steps of: a positioning stage moving the substrate under an objective lens component; while the substrate is moving, changing an angle of a scan mirror such that an image of the substrate (or the portion thereof), that is acquired by the objective lens component, is still with respect to a camera; and the camera recording the image of the substrate (or the portion thereof) while the substrate is moving. In one aspect, the step of changing the angle of the scan mirror comprises a servo mechanism moving the scan mirror, while the positioning stage is moving the substrate under the objective lens component, in order to keep the image of the substrate (or the portion thereof) still with respect to the camera while the image is being acquired through the objective lens component. In another aspect, the step of the camera recording the image of the substrate (or the portion thereof) comprises the camera operating with readout efficiency in a range from 10% to 55%. In another aspect, the step of the camera recording the image of the substrate (or the portion thereof) comprises the camera operating with a line rate in a range from 1,000 lines per second to 1,000,000 lines per second. In another aspect, the step of the positioning stage moving the substrate comprises moving the substrate with a velocity in a range from 100 μm/second to 1,000 mm/second. In another aspect, the camera is one of a CMOS camera and a non-CMOS camera capable of operating in a full-frame mode. In another aspect, the camera has a number of camera pixels in a range from 100,000 pixels to 100 million pixels. In another aspect, the substrate comprises an array having target nucleic acids disposed thereon. In yet another aspect, the substrate comprises a multitude of distinct features that are targets for imaging.

In an example embodiment, the method for imaging a substrate (or a portion thereof) further comprises measuring the angle of the scan mirror by using an angle sensor, and using measurement from the angle sensor in changing the angle of the scan mirror. In one aspect, the angle sensor includes one or more of an optical lever and a linear array detector.

In an example embodiment, the method for imaging a substrate (or a portion thereof) further comprises tilt an optical plate, in the optical path between the objective lens component and the camera, to make offset corrections in the image of the substrate (or the portion thereof). In one aspect, the method further comprises: measuring the angle of the scan mirror to detect whether there are any nonlinearities in the motion of the scan mirror; and using the offset corrections to remove, from the image of the substrate (or the portion thereof), any nonlinearities that are detected in the motion of the scan mirror.

In an example embodiment, an imaging system comprises a camera, an objective lens component, a scan mirror, and a positioning stage. The objective lens component images an array chip onto the camera. The scan mirror moves in angular motion and reflects light from the objective lens component to the camera. In coordination with the scan mirror, the positioning stage moves the array chip with respect to the objective lens component. In one aspect, the array chip has macromolecules disposed thereon and the camera is CMOS camera.

In an example embodiment, the imaging system further comprises a tube lens component, where the scan mirror directs the light from the objective lens component to the tube lens component. In one aspect, the angular motion of the scan mirror allows the camera to acquire a still image of the array chip while the array chip is being moved by the positioning stage.

In an example embodiment, the imaging system further comprises a tilt plate between the scan mirror and the camera, where the tilt plate provides first image offset corrections. In one aspect, the imaging system further comprises a second tilt plate between the scan mirror and the camera, where the second tilt plate provides second image offset corrections in a direction that is perpendicular to the first image offset corrections.

In an example embodiment, the imaging system further comprises an angle sensor that measures an angle of the scan mirror. In one aspect, the angle sensor comprises an optical lever. In another aspect, the angle sensor comprises a laser and a linear array detector that detects light from the laser that is reflected by the scan mirror.

In an example embodiment, the imaging system further comprises an illumination light source and a dichroic mirror.

In an example embodiment, a method for imaging an array chip having DNA macromolecules disposed thereon comprises the steps of: a positioning stage moving the array chip under a microscope objective; changing an angle of a scan mirror such that an image of the array chip, that is acquired by the microscope objective, is still with respect to a camera; and the camera recording the image of the array chip while the array chip is moving. In one aspect, the camera is a CMOS camera.

In an example embodiment, the method for imaging an array chip having DNA macromolecules disposed thereon further comprises the steps of: measuring the angle of the scan mirror by using an angle sensor; and using measurement from the angle sensor in changing the angle of the scan mirror. In one aspect, the angle sensor includes one of an optical lever and a linear array detector.

In an example embodiment, the method for imaging an array chip having DNA macromolecules disposed thereon further comprises the step of tilting an optical plate, in an optical path between the microscope objective and the camera, to make offset corrections in the image of the array chip. In one aspect, the method further comprises the steps of: measuring the angle of the scan mirror to detect whether there are any nonlinearities in the motion of the scan mirror; and using the offset corrections to remove, from the image of the array chip, any nonlinearities that are detected in the motion of the scan mirror.

It is noted that as used herein and in the appended claims, the singular forms "a," "an," and "the" may include plural referents unless the context clearly dictates otherwise. Thus, for example, reference to "an attachment site", unless the context dictates otherwise, may refer to multiple such attachment sites, and reference to "a method for sequence determination" may include reference to equivalent steps and methods that may be used by those skilled in the art, and so forth.

Unless defined otherwise, all technical and scientific terms used herein have the same meaning as commonly understood by one of ordinary skill in the art to which this invention belongs. All publications mentioned herein are incorporated herein by reference for the purpose of describing and disclosing devices, formulations, and methodologies which are described in the publication and which might be used in connection with the presently described invention.

Where a range of values is provided, it is understood that each intervening value, between the upper and lower limit of that range and any other stated or intervening value or sub-range in that stated range is encompassed within the invention. The upper and lower limits of such smaller ranges may independently be included in the smaller ranges, and are also encompassed within the invention, subject to any specifically excluded limit in the stated range. Where the stated range includes one or both of the limits, sub-ranges excluding either or both of those included limits are also included in the invention.

Selected Definitions

"Image space" refers to the area covered by the set of pixels in a camera, and "image space pixel" refers to a camera pixel.

"Logic" refers to a set of instructions which, when executed by one or more processors (e.g., CPUs) of one or more computing devices, are operative to perform one or more functionalities and/or to return data in the form of one or more results or of input data that is used by other logic elements and/or by elements that control the operation of mechanical devices (e.g., such as servos and the like). In various embodiments and implementations, any given logic may be implemented as one or more software components that are executable by one or more processors (e.g., CPUs), as one or more hardware components such as Application-Specific Integrated Circuits (ASICs) and/or Field-Programmable Gate Arrays (FPGAs), or as any combination of one or more software components and one or more hardware components. The software component(s) of any particular logic may be implemented, without limitation, as a stand-alone software application, as a client in a client-server system, as a server in a client-server system, as one or more software modules, as one or more libraries of functions, and as one or more static and/or dynamically-linked libraries. During execution, the instructions of any particular logic may be embodied as one or more computer processes, threads, fibers, and any other suitable run-time entities that can be instantiated in the hardware of one or more computing devices and can be allocated computing resources that may include, without limitation, memory, CPU time, storage space, and network bandwidth.

"Object space" refers to the area of an object (e.g., such as a substrate), and thus "object space pixel" refers to a unit of area on an object (e.g., such as a substrate). The size of object space pixels is typically determined by the size of the image space pixels (i.e., camera pixels) and the magnification that is applied when the camera is used to take images of the object space. The magnification is the ratio of the size of an image space pixel (i.e., a camera pixel) to the actual size of the object space area that corresponds to the image space pixel as observed by the camera. For example, a magnification of 16× allows a camera using 8 μm pixels to observe 500 nm object space pixels. In various embodiments, the size of an object space pixel may be between 100-1000 nm in width and 100-1000 nm in length; in a preferred aspect the size of an object space pixel may be 300 nm by 300 nm, more preferably 500 nm by 500 nm, even more preferably 620 nm by 620 nm. In some embodiments that use array chips, the size of an object space pixel is selected to be substantially the same as, or slightly bigger, than the size of an attachment site on an array chip, so that only a single discrete site will fit into an object space pixel. This ensures that, in operation, the intensity of the energy (e.g., light) emitted from an attachment site on the array chip can be recorded by a single camera pixel.

"Objective lens component" refers to an element or group of elements, in an imaging system, that comprises one or more lenses and is configured and operative to magnify an electromagnetic (e.g., such as optical) signal. In some embodiments, an objective lens component has a large numerical aperture (NA) (e.g., NA in a range between 0.95 and 1.5) and performs imaging via air immersion or liquid immersion (e.g., such as water, oil, or other immersion fluids). In various embodiments, an objective lens component may have a focal length in the range from 2 mm to 25 mm.

"Sequence determination" (also referred to as "sequencing") in reference to a target nucleic acid means determination of information relating to the sequence of nucleotides in the target nucleic acid. Such information may include the identification or determination of partial and/or full sequence information of the target nucleic acid. The sequence information may be determined with varying degrees of statistical reliability or confidence. In one aspect, the term "sequencing" includes the determination of the identity and ordering of a plurality of contiguous nucleotides in a target nucleic acid starting from different nucleotides in the target nucleic acid.

"Substrate" refers to an object having a multitude of distinct features that are targets for imaging. For example, in some embodiments a substrate comprises a non-planar structure with a surface, such as a bead or a well, to which target nucleic acids have been attached as the target features. In another example, in some embodiments a substrate comprises an array chip. "Array chip" (also referred to as "array", "microarray", or simply "chip") refers to a solid phase support having a surface, preferably but not exclusively a planar or substantially planar surface, that carries attachment sites to which target nucleic acids (e.g., such as macromolecules) have been attached as the target features. On an array chip, the attachment sites may be arranged in an ordered pattern or in random fashion, and are typically configured to have dimensions (e.g., length, width, and possibly depth or height) that are suitable for the attachment of target nucleic acids. An attachment site is thus spatially defined and is not overlapping with other sites; that is, the attachment sites are spatially discrete on the array chip. When attached to the attachment sites, the target nucleic acids may be covalently or non-covalently bound to the array chip. A "random array" (or "random microarray") refers to an array chip where the identities of the target nucleic acids (or of oligonucleotides or polynucleotides thereof) are not discernible, at least initially, from their location on the array chip but may be determined by a particular operation on the array, such as sequencing, hybridizing decoding probes, or the like. (See, for example, U.S. Pat. Nos. 6,396,995; 6,544,732; 6,401,267; and 7,070,927; WO publications WO 2006/073504 and 2005/082098; and US Pub Nos. 2007/0207482 and 2007/0087362. Also, some conventional microarray technology is reviewed in, for example, Schena, Ed. 2000, Microarrays: A Practical Approach, IRL Press, Oxford). The types and numbers of the target features of a substrate may vary in different implementations, operational contexts, and applications. For example, in various embodiments an array chip may have attached thereon a multitude of target nucleic acids in numbers that: (a) range between 1 million and 15 billion; (b) result in target nucleic acid occupancy of attachment sites in a range between 50% and 95% or greater; and/or (c) result in an average target nucleic acid density on the array chip in a range between 0.5 per $\mu m^2$ and 10 per $\mu m^2$ or greater. Further, in some embodiments, a substrate may be disposed in fluidic devices such as flow slides or flow cells. A flow slide is typically open to the environment and the rate of flow of liquids across the substrate is determined mainly by gravity. A flow cell, on the other hand, typically encloses its substrate from the environment and offers a closed liquid path that is used by a pressure-driven system (e.g., comprising various types of pumps, valves, lines, and other fluidic connections) to move fluids in and out of the flow cell. In general, in different embodiments and implementations, a substrate can be embodied in various and different devices with various and different features that are targets for imaging; for this reason, the examples of substrates and target features thereof described in this paragraph are to be regarded in an illustrative rather than a restrictive sense.

"Target nucleic acid" means a nucleic acid from a gene, a regulatory element, genomic DNA, cDNA, RNAs (including mRNAs, rRNAs, siRNAs, miRNAs, and the like), and fragments thereof, that is the subject of sequencing, observation, and/or other study. A target nucleic acid may be a nucleic acid from a sample, or a secondary nucleic acid such as a product of amplification and/or replication reaction(s). An example of such product is a macromolecule. "Macromolecule" used in relation to a nucleic acid means a nucleic acid having a measurable three dimensional structure, including linear nucleic acid molecules comprising secondary structures (e.g., amplicons), branched nucleic acid molecules, and multiple separate copies of individual sequences with interacting structural elements, e.g., complementary sequences, palindromes, or other sequence inserts that cause three-dimensional structural elements in the nucleic acid.

Imaging Systems for Scanning Moving Targets

The imaging systems described herein are configured to scan a continuously moving target (e.g., such as a substrate) by using fast cameras that do not move the image through the camera. For example, in some embodiments imaging systems for DNA sequencing can be configured with CMOS cameras or scientific CMOS (sCMOS) cameras. Since full-frame cameras, unlike CCD-array cameras, cannot operate in TDI mode, the consequence of this operational limitation is that an image must not move with respect to the full-frame camera's sensor array during acquisition. The imaging systems described herein address this operational limitation at least in part by providing a scan mirror (and/or another optical device) that can hold the image still on the camera sensor while a positioning stage is moving a substrate (e.g., an array chip) under an objective lens component. In this manner, the imaging systems described herein overcome the operational limitation of full-frame cameras (e.g., such as CMOS cameras) while attaining the advantages of these cameras' high speed, high resolution, and low cost.

The imaging systems described herein also attain the speed, accuracy, and throughput advantages that can result from scanning a moving substrate as compared to using TDI imaging systems as previously noted and step-and-repeat imaging systems. When TDI imaging is used, a substrate may be continuously scanned under a moving microscope objective such that the image of the chip moves across the sensor array of a TDI camera at the same speed that image data is read out. However, TDI cameras are generally expensive and may not provide high enough resolution for some sequencing implementations that require very high throughput. Step-and-repeat systems, on the other hand, need to stop the motion of a substrate for each image as a positioning stage moves the substrate to a new position between images. Thus, in addition to lower throughput because of the starts and stops, in the step-and-repeat systems the acceleration and deceleration of the positioning stage leads to less accurate alignment between the substrate and the camera, especially when performed quickly to maintain imaging throughput.

The imaging systems described here preserve the use of mechanically desirable continuous stage motion, but freeze the image of a substrate with respect to a camera's sensor array during image acquisition. In some embodiments, this is accomplished through the use of a lightweight, servo-controlled, scan mirror that can be accelerated and decelerated much more easily and accurately than a heavier positioning stage. Devices for monitoring scan mirror performance and making small image position corrections on the fly may also be part of the imaging systems in some embodiments. As a result, an imaging system in accordance with the techniques herein can acquire 550 megapixels (or more) of image data per second while maintaining about 50 nm alignment accuracy. Coupled in a sequencing machine with suitable biochemical reaction subsystem, such imaging system allows for very high sequencing throughput such as, for example, sequencing of about 100 human genome equivalents of data per day.

In some embodiments, the imaging system is a fluorescence-based system that comprises an objective lens component, one or more cameras, a movable positioning stage, and preferably, but not exclusively, a tube lens component. In these embodiments the imaging system is configured and operative to take images of entire substrates (e.g., such as array chips) or of portions thereof, where the substrate is mounted or otherwise placed on the positioning stage and is in motion while the images are being taken by the camera(s). According to the techniques described herein, such imaging system allows the use of a really fast camera (e.g., such as a CMOS camera) to acquire images of the moving substrate. To facilitate this mode of system operation, the techniques described herein provide for a movable scan mirror that is disposed in the optical path between the objective lens component and the camera(s). This arrangement of components is in contrast to conventional imaging systems, which generally employ objective lenses and a camera that are perfectly aligned along the optical path and therefore do not allow for movable components in the middle of that optical path because such movable components generate effects that are considered undesirable in conventional imaging systems.

It is worth noting that fluorescence-based imaging systems that are used for DNA sequencing typically employ very low light levels because fluorescence images are dim. Thus, the camera(s) and the optics in such imaging systems need to be as efficient and sensitive as possible in order to keep image acquisition time to a minimum. Further, illumination intensity must remain below the point where it can damage the target nucleic acids that are being sequenced. These factors are some of the factors that need to be taken into account when designing fluorescence imaging systems for imaging of moving target nucleic acids.

Fast Cameras

The imaging systems described herein are configured to use fast cameras in conjunction with a movable scan mirror in order to achieve continuous exposure of a still image while the substrate being imaged is moving. In some embodiments, the size (length and/or width) of a camera pixel is in a range from 5 μm to 10 μm, preferably but not exclusively in the range of 6-8 μm.

In various embodiments, the imaging systems described herein are configured to scan a continuously moving substrate (e.g., such as an array chip) by using fast cameras that do not move the image through the camera—e.g., such as non-TDI cameras and other cameras (including TDI cameras) that operate in full-frame 2D mode. CMOS cameras are an example class of such cameras. CMOS cameras typically use an active-pixel sensor (APS) that is an image sensor comprising of an integrated circuit containing an array of pixels, where each pixel includes a photodetector and an active amplifier. One example of a CMOS camera is the SciMOS 2051 model from Fairchild Imaging, Milpitas, Calif. The SciMOS 2051 is a fast camera that can capture 5.5 megapixel images at 100 frames per second with 286 MHz readout and less than two electrons typical read noise.

Preferably, but not exclusively, the high speed of a camera is defined by line rate, which is an operational characteristic of the camera that defines the number of pixel rows that can be read out from the camera in a unit of time. The line rate of a camera can be determined according to equation (1) below:

$$R_{line} = \frac{P_{readout\text{-}frequency}}{N_{pixels\text{-}per\text{-}line}} \quad (1)$$

where "$R_{line}$" is the line rate of the camera, "$P_{readout\text{-}frequency}$" is the pixel readout frequency of the camera (e.g., the number of pixels that can be read out in unit of time), and "$N_{pixels\text{-}per\text{-}line}$" is the number of pixels in a sensor row of the camera. For example, a camera that has 286 MHz readout frequency and 2560 pixels per array sensor row, would have a line rate of $R_{line}$=286 MHz/ 2560≈$10^5$ lines per second.

Alternatively, a high-speed camera may be defined in terms of the number of pixels that the camera can expose in a unit of time. For example, the speed of the camera may be defined by the mathematical product of the number of pixels in the field of view and the frames per second that the camera can take. Thus, a camera with a field of view of 5.5 megapixels (e.g., a view of 2560 pixels by 2160 pixels) running at 100 frames per second (fps) would be able to expose 550 megapixels per second; thus, such camera is termed herein as a "550" megapixel camera. Examples of such cameras include, without limitation, CMOS, sCMOS, and similar cameras. In various embodiments, the imaging systems described herein may use cameras in the range from 10 megapixels to 2500 megapixels.

Efficient and Fast Imaging of Moving Targets

According to the techniques described herein, the imaging systems in various embodiments are configured to image moving substrates in a scanning fashion. In such embodiments, a substrate is typically mounted (or otherwise placed) on a positioning stage that is coupled to one or more mechanisms (e.g., such as motors, actuators, etc.) that can continuously move the substrate under an objective lens component while a camera is taking images of the substrate (or of portions thereof). The positioning stage is configured and operative to move the substrate along a direction that is normal to the optical axis of the objective lens component. (It is noted that this is orthogonal to the operation of autofocus-types of mechanisms, which generally move an object and/or an entire objective along the optical axis of the objective.)

According to the techniques described herein, the motion of the stage is coordinated with the reverse back-scanning motion of a scan mirror so that an image of the substrate (or portion thereof) is held still (stable) on the camera for a period of time that provides sufficient exposure. In other words, while the stage is moving, a still image of the substrate mounted thereon is being exposed to the camera. The image stabilization during the exposure period is provided by the motion (e.g., tilting) of the scan mirror in the optical path between the objective lens component and the camera. Thus, the scan mirror and the positioning stage are effectively coupled in a coordinated back-scanning operation in order to hold the image still/stable while the substrate being imaged is in continuous motion.

In an example embodiment of an imaging system, in operation the positioning stage is moving the substrate that is mounted thereon while a computer system executes logic to read one or more rows of exposed pixels from the camera.

At the same time, the same and/or different computer system executes logic to synchronize the timing of the scan mirror to the timing of the positioning stage so that the scan mirror back-scans and keeps still another image on the camera thereby exposing another set of one or more rows of camera pixels.

In such mode of operation, the velocity of the positioning stage can be calculated according to equation (2) below:

$$V_{stage} = S_{pixel} * R_{line} * \eta \qquad (2)$$

where "$V_{stage}$" is the stage velocity, "$S_{pixel}$" is the size (e.g., length or width) of an object space pixel, "$R_{line}$" is the line rate of the camera (e.g., the rate at which rows of pixels are read out from the camera), and "$\eta$" is the efficiency of the overall readout from the camera (e.g., as expressed in a percentage of time that readouts can be extracted from the camera without compromising other on-going exposure). For example, in various embodiments, the size (e.g., length and/or width) of object space pixels can be in a range from 100 nm to 1000 nm, the camera line rate can be in a range from $10^3$ lines per second (Hz) to $10^6$ lines per second (Hz), and the efficiency of the overall readout from the camera can be in a range from 10% to 90% or greater. Thus, in various embodiments, the velocity of the positioning stage may be in a range from 0.1 mm per second to 1000 mm per second (or greater). In an example embodiment, the object space pixel is 620 nm, the camera line rate is $10^5$ lines per second (Hz), and the efficiency of the overall readout from the camera is 90%, which provide for a stage velocity of about 55.8 mm per second.

According to the techniques described herein, one or more computing devices and/or various logic thereof are configured and operative to control the coordinated motions of the scan mirror and the positioning stage. Thus, in some embodiments the positioning stage (and therefore the substrate mounted thereon) can be configured to move with constant velocity, in which case the back-scan motion of the scan mirror will also be at a suitable constant velocity. In other embodiments, the positioning stage can be configured to move with non-constant velocity, in which case the back-scan motion of the scan mirror will also be at a suitable non-constant constant velocity.

In various embodiments, various mechanisms may be used to facilitate the motion of the positioning stage at a given desired velocity. Such mechanisms may comprise one or more components that cause motion (e.g., such as linear motors, lead screws, screw motors, speed screws, etc.) and one or more components (e.g., such as various types of bearings) that reduce friction.

For example, some embodiments may provide a mechanism with air bearings to move the positioning stage. An air bearing is a thin film of pressurized air that provides very low friction interface (e.g., a bearing gap) between two surfaces. Thus, in these embodiments the bottom surface of the positioning stage is not in direct contact with another surface but is rather suspended over an air bearing gap, which is such that (although the air constantly escapes from the bearing gap) the applied air pressure between the faces of the bearing is enough to support the load of the positioning stage. Use of such air bearings in the imaging systems described herein allows for locking a still image onto the camera within an alignment tolerance of 10-20 nm.

In another example, some embodiments may use metal bearings (e.g., such as ball bearings, cylinder bearings, cross-roller ball bearings, etc.) that have repeatability of several microns. Repeatability is fundamentally the effect of rolling a metal bearing in oil—as the metal bearing rolls it bounces, and such bouncing introduces jitter in the motion of the object that is being moved on the bearings. The "repeatability" of such motion can be uniform only above a certain range because any two metal bearings can bounce in the same way only within a certain tolerance. Thus, embodiments that use ball bearings typically have greater alignment tolerances (e.g., tolerances greater than 20 nm), have lower velocity of the positioning stage, and/or may use multiple camera pixels per object space pixels.

As the above equation (2) illustrates, the efficiency of the overall camera readout ("$\eta$") is one parameter that determines the overall throughput of the imaging system. For example, depending on the mechanisms used to illuminate the substrate that is being imaged, there may be at least several different embodiments that yield different readout efficiency. In one embodiment, $\eta$=90% (or greater) camera readout efficiency can be achieved by using scanned illumination (e.g., as described in U.S. Provisional Patent Application No. 61/656,744, titled "TECHNIQUES FOR SCANNED ILLUMINATION" and filed on the same day herewith, the entire contents of which are hereby incorporated by reference as if fully set forth herein). In another embodiment, $\eta$=30-55% (or greater) camera readout efficiency can be achieved by using laser light sources that are controlled by acousto-optic modulators (AOMs) or other types of fast switches capable of producing pulsed laser beams. In another embodiment, $\eta$=10-30% (or greater) camera readout efficiency can be achieved by using broadband illumination and a camera operating in standard full-frame mode.

For example, in some embodiments an imaging system operates a camera in a full-frame mode to capture an image that spans multiple rows of camera pixels (also referred to as a "two-dimensional" image). In these embodiments, in order to improve the overall camera readout efficiency of the camera that operates in full-frame mode, the imaging system is configured to expose one set of pixel rows while simultaneously reading out the pixels in one or more other (already exposed) sets of pixel rows. Thus, while the camera is collecting a two-dimensional image of a substrate portion by exposing one set of pixel rows, a computer system executes logic to read out another set of pixel rows that has already been exposed. This mode of operation may be further optimized by using scanned illumination, which maximizes the percentage of time that readouts can be extracted from the camera. For example, while the camera is collecting a two-dimensional image of a portion of the substrate, a computer system executes logic to scan a line of light across the portion of the substrate by changing an angle of an illumination mirror, thereby exposing first row(s) of pixels in the camera and keeping in the dark other, second row(s) of pixels. Then, when the exposure of the first row(s) of pixels is completed, the computer system executes logic to read out the first row(s) of pixels while at the same time continuing to scan the line of light across the portion of the substrate to expose the second row(s) of pixels.

Example Scanning Imaging System

FIG. 1 is a diagram of a scanning fluorescence imaging system 100 according to an example embodiment. The imaging system 100 of FIG. 1 temporarily fixes an image of a substrate (e.g., such as an array chip 105) on the sensor of a camera 125 as the substrate is scanned past a microscope objective lens component 115.

In the embodiment illustrated in FIG. 1, array chip 105 carries target nucleic acids such as, for example, DNA macromolecules. Positioning stage 110 moves array chip 105 with respect to objective lens component 115. Positioning stage 110 is a high-precision, computer-controlled, air-bearing stage. Objective lens component 115 is an off-the-shelf objective. In some embodiments, the objective lens component may be a custom-designed, multi-element optical component. Further, in some embodiments water immersion may be used to increase the numerical aperture (NA) of the objective lens component.

Objective lens component 115 and tube lens component 120 project an image of a portion of array chip 105 onto the sensor array of camera 125. Tube lens component 120 is an element or group of elements that comprises one or more tube lenses that function as a second magnification objective. Camera 125 is a fast CMOS camera that preferably, but not exclusively, operates in full-frame mode and employs a sensor array characterized by low read noise, high resolution, and high imaging speed.

In the embodiment illustrated in FIG. 1, scan mirror 130 is a lightweight mirror that is tilted by a servo rotation mechanism (not shown) including the underlying feedback-controlled servo system (not shown). Lines 132 and 134 pivotally positioned on the same axis as scan mirror 130 show the range of angular motion of scan mirror 130. As scan mirror 130 tilts back and forth between extreme positions 132 and 134, the area within the field of view of objective lens component 115 is imaged on the sensor elements of camera 125. When the motion of scan mirror 130 is coordinated with the motion of positioning stage 110, a fixed area on array chip 105 is imaged by the camera while the stage is moving. The rotation of scan mirror 130 (e.g., around an axis perpendicular to the plane of FIG. 1) has the effect of scanning an image in the y-direction shown in the figure. This result is obtained because tilt in the collimated section of imaging system 100, in which scan mirror 130 is placed, corresponds to lateral translation at the focal plane of camera 125.

The illumination for fluorescence imaging is provided by illumination source 155 (e.g., such as one or more lasers or other source of illumination). Illumination light is directed into the optical path by a dichroic beam splitter 150, which reflects at illumination wavelengths but transmits at fluorescence emission wavelengths. In an imaging system that interrogates more than one type of fluorescent marker at a time, multiple illumination sources (e.g., such as multiple lasers each emitting a separate spectrum of light) and dichroic beam splitters may be used. In various embodiments, the illumination source can emit light of various wavelengths that are compatible with various fluorophores that can be used in sequencing such as, for example, light of wavelength in a range from 400 nm to 800 nm.

In imaging system 100, tilt plates 140 and 145 are used to make small corrections to image placement on the sensor array of camera 125. As an example, a tilt plate made of glass approximately 2.5 cm in diameter and 3.5 mm thick weighs only a few grams. The plate is mounted on a servo rotation mechanism (not shown) for quick and precise movements under feedback control of a servo system. When light passes through tilt plate 140 at non-normal incidence, its position is offset by an amount Δx given by equation (3) below:

$$\Delta x = t \sin \theta - \frac{t}{n} \frac{\cos \theta \sin \theta}{\sqrt{1 - \left(\frac{1}{n} \sin \theta\right)^2}} \quad (3)$$

where "t" is the thickness of the plate, "n" is its index of refraction and "θ" is the angle of incidence. For a glass plate (n=1.5) of the dimensions given above, a five degree tilt produces a lateral image offset of about 100 μm. A similar relationship holds in the y-direction for tilt plate 145.

Based on the above equation (3), information on image alignment with respect to the sensor array of camera 125 is used to provide feedback signals that drive tilt plates 140 and 145. One source of such alignment information is the results of analyzing images acquired by the camera. Another source of alignment information in the y-direction is obtained by monitoring the performance of scan mirror 130 as described below. In some embodiments, such image alignment information is sent to a computing device that executes the logic that controls the operation of the scan mirror, the chip positioning stage, the one or more tilt plates, and preferably (but not necessary) the operation of the illumination source(s) and/or any illumination mirrors involved in illuminating the array chip being imaged.

Example Scanning Operations

Figure 2:
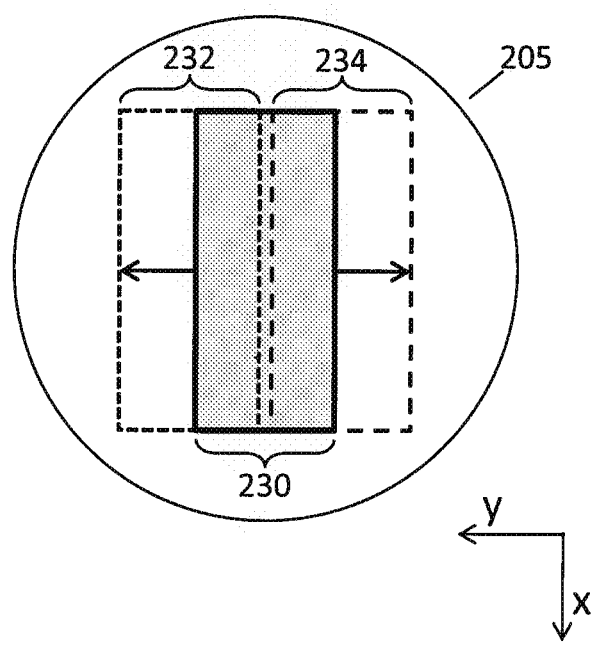
FIG. 2 is a block diagram with example details of imaging areas within a microscope field of view according to one embodiment.

FIG. 2 is a detail of imaging areas within a field of view of an objective lens component according to an example embodiment. In FIG. 2, circle 205 represents the field of view of objective lens component 115 in FIG. 1. Shaded rectangle 230 represents the area within field of view 205 that is imaged on the sensor array of camera 125 when scan mirror 130 is in a mid-range position. Rectangles 232 and 234 (with dashed line borders) represent the area within field of view 205 that is imaged on the sensor array of camera 125 when scan mirror is in extreme positions 132 and 134, respectively.

In operation, objective lens component 115 is focused on array chip 105 that is steadily moving in the y-direction and scan mirror 130 rotates from position 134 to 132. If the speed of array chip 105 is the same as the speed of the area within field of view 205 that is imaged on camera 125, then the image of the chip on the camera does not move thereby allowing sufficient exposure onto the image sensor of the camera.

The image is stationary with respect to camera 125 only during the time that the imaged object space area moves from the position indicated by rectangle 234 to that indicated by rectangle 232. When scan mirror 130 reaches extreme position 132, it must then "fly-back" to position 134. The fly-back time can be configured to be only a small fraction of the scan mirror cycle, however, and consecutive imaged areas may be made contiguous or even overlap if necessary. For better efficiency, the amount of time spent by the scan mirror on each imaged area is made commensurate with the camera's frame rate, thereby allowing sufficient time to expose an image of each object space area onto the camera while at the same time allowing image data to be read out from the camera for other object space areas that have already been imaged and are out of the field of view.

To break the imaging problem into manageable chunks, in some embodiments the attachment sites of an array chip are divided into micron-to-millimeter sized fields. (For example, in various aspects a typical field may be of a size in the ranges of 320-1600 μm by 320-1600 μm, 500-600 μm by 500-600 μm, or even 1.6 mm by 700 μm.) A typical array chip may be divided into hundreds or thousands of fields that are arranged in a rectangular pattern of rows and columns. (For example, the rows and columns of fields may include track regions that are aligned substantially along a horizontal dimension and a vertical dimension, respectively.)

In such embodiments with fields of attachment sites, the techniques described herein provide for scanning and imaging the array chip portion-by-portion, where each portion is a column that spans one or more fields in length and one or more fields in width. In one example, an imaging system images an array chip in a scanning fashion (as described herein) while the positioning stage is moving the array chip along ay-direction in a plane and/or axis that is substantially normal to the optical axis of the objective lens component. In this example, the imaging system ceases imaging when the end of the column of field(s) being imaged is reached in order to allow the positioning stage to return the array chip and to position it for imaging of the next column of field(s). In another example, an imaging system images an array chip in a scanning fashion (as described herein) while the positioning stage is moving the array chip backward and forward in a serpentine fashion (e.g., along ay-direction) in a plane that is substantially normal to the optical axis of the objective lens component. In this example, the imaging system images a column of field(s) while the positioning stage is moving the array chip in one direction and then images the next/adjacent column of field(s) while the positioning stage is moving/returning the array chip in the opposite direction; in other words, the imaging system images the array chip by effectively traversing the columns of fields in a continuous serpentine fashion.

Imaging for high-throughput DNA sequencing typically requires high accuracy image alignment because of the high density and small size of the target nucleic acids that are disposed on the substrate being imaged. However, in some embodiments the mechanisms that can drive a scan mirror (e.g., such as commercially available servo scanners) may not be accurate enough by themselves. Thus, an imaging system in accordance with the techniques described herein may use an additional subsystem to measure scan mirror performance and correct scanning errors.

Correction of Linearity Errors

With respect to FIG. 2, a perfect scan mirror subsystem would move image area 230 within field of view 205 linearly with time—that is, if the image area moves a certain distance in one millisecond, it should move twice that distance in two milliseconds. However, such perfect motion of the scan mirror is difficult to achieve in practice.

Figure 3:
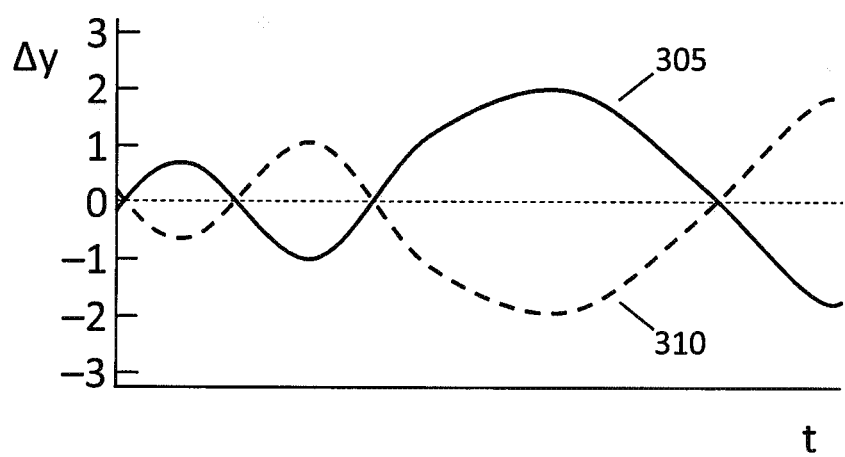
FIG. 3 is a graph of scan mirror linearity errors and corrections according to one embodiment.

FIG. 3 is a graph of scan mirror linearity errors and corrections in accordance with an example embodiment. Graph 305 of FIG. 3 shows deviations from ideal, linear scanning over one scan cycle excluding fly-back time. The deviation from linear motion of the scan mirror, $\Delta y$, may be measured in any convenient distance unit; here, graph 305 shows the deviation in image sensor pixels. Graph 310 shows the correction that is required to remove the error represented by graph 305. If the error for a particular part of the scan range is +1.15 pixels, for example, then the corresponding correction is −1.15 pixels.

In some embodiments, the correction signal represented by graph 310 may be applied as feedback to tilt plate 145 shown in FIG. 1. For example, a computing device may execute logic that receives linearity error information, computes the necessary error correction term (e.g., based on $\Delta y$), and causes a servo mechanism to rotate tilt plate 145 based on the error correction term. Since the corrections made by tilt plate 145 are small, its own nonlinearities can be neglected. Measurements of scan mirror performance can be made with a scan mirror angle sensor as shown in FIG. 4.

Scan Mirror Operation Control

Figure 4:
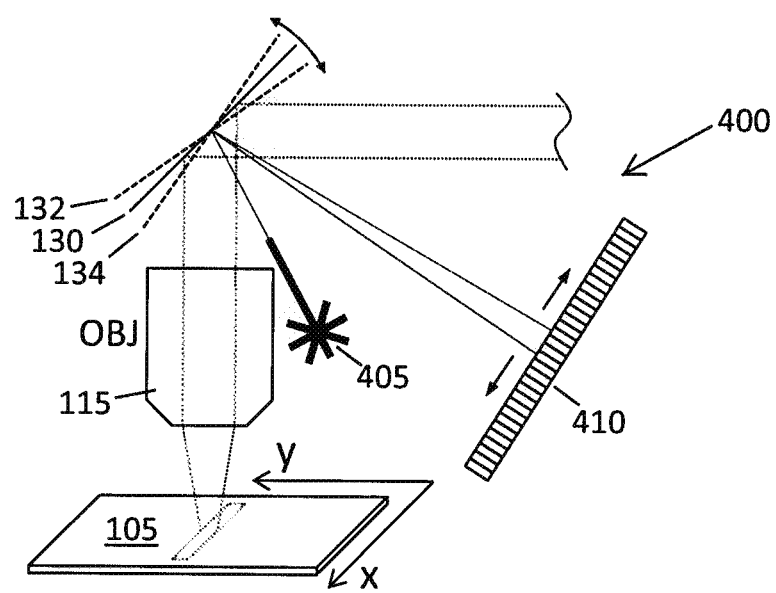
FIG. 4 is a block diagram of a part of an example imaging system that includes a scan mirror angle sensor, according to one embodiment.

FIG. 4 is a diagram of an example imaging system that includes a scan mirror angle sensor according to one embodiment. In FIG. 4, components of the imaging system that are the same as those illustrated in FIG. 1 are identified with the same reference numbers. Thus, in FIG. 4, array chip 105 is mounted on a positioning stage (not shown) and carries target nucleic acids. Objective lens component 115 may be an off-the-shelf microscope objective or a custom-designed, multi-element optical component. Scan mirror 130 is a lightweight mirror that is tilted by a servo rotation mechanism. Dotted lines 132 and 134 show the range of angular motion of scan mirror 130.

Angle sensor 400 is an optical lever that includes laser 405 and linear array detector 410. Sensor 400 measures the tilt angle of scan mirror 130 precisely and quickly. In one embodiment, linear array detector 410 has approximately 2,000 elements, about 3 or 4 of which are illuminated by light from laser 405 that is reflected by scan mirror 130 before arriving at the detector. As scan mirror 130 tilts, different elements of array detector 410 detect light from laser 405. Angle sensor 400 can provide mirror angle measurements at rates of 40 kHz or more. In some embodiments, reflections off one or more additional fixed mirrors may be used so that the measuring beam can hit the scan mirror multiple times, thereby increasing the sensitivity of the optical lever. The angle measurements from linear array detector 410 are used to provide corrections to a y-direction tilt plate (not shown), where the linearity of the corrected scan mirror subsystem is one part in 10,000 or better. For example, in some embodiments the linear array detector provides angle measurement information to logic executing in a computing device, where the logic uses the measurement information to compute the necessary correction term for the y-direction and to cause a servo mechanism to rotate the tilt plate based on the computed correction term.

By using a scan mirror as described herein, an imaging system can use a camera that operates in a full-frame mode (e.g., such as a CMOS camera that does not operate in TDI mode) to acquire still images of a moving substrate. In some embodiments that are employed for DNA sequencing, the extreme alignment accuracy requirements of fluorescence imaging may necessitate the use of a scan mirror angle sensor and an image offset correction subsystem (e.g., such as one or more tilt plates) to remove nonlinearities in the scan mirror motion. In some embodiments, such imaging system may be extended to provide for simultaneous fluorescence imaging at different wavelengths by including additional light sources with associated dichroic beam splitters to send emitted light to additional cameras. In such embodiments, each camera may have its own scan mirror angle sensor and subsystem of tilt plate(s) to provide small alignment corrections as needed.

Example Methods of Use

Figure 5:
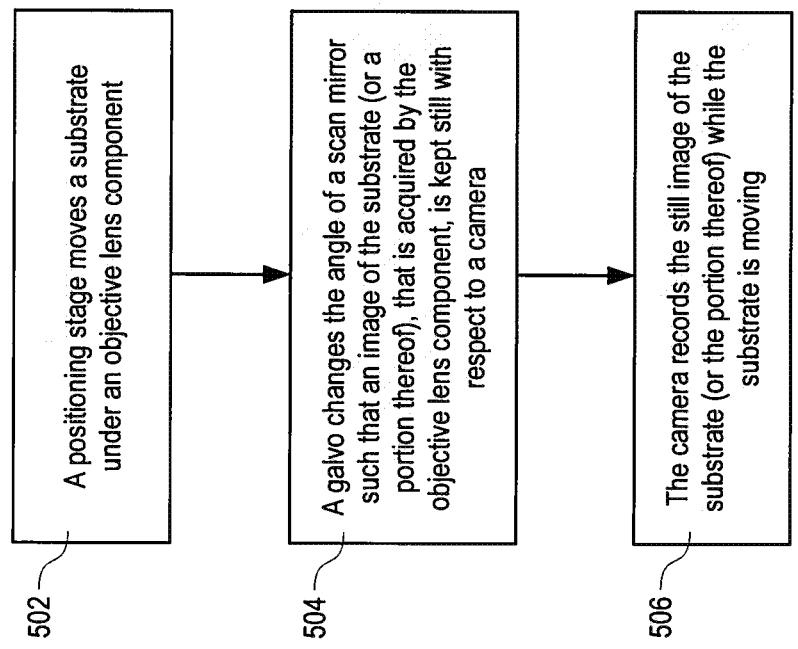
FIG. 5 is an example method for imaging a substrate according to one embodiment.

FIG. 5 illustrates an example method for imaging a substrate according to one embodiment. For illustration purposes, the method in FIG. 5 is described hereinafter as being performed by a sequencing machine that includes an imaging system; it is understood, however, that the steps of the method can be performed by various different types of devices and imaging systems. Thus, the method in FIG. 5 is not limited to being performed by any particular type of machine or device, and therefore the method description hereinafter is to be regarded in an illustrative rather than a restrictive sense.

In step 502, a positioning stage moves a substrate under an objective lens component in a plane that is normal to the optical axis of the objective lens component, where the substrate comprises a multitude of distinct features that are the targets of the imaging. In some aspects, the substrate comprises an array chip having target nucleic acids disposed thereon, and a sequencing machine includes an imaging system that in turn includes the positioning stage and the objective lens component as well as a fast camera that operates in full-frame mode. For example, the camera may be a CMOS camera with a line rate in a range from 1,000 lines per second to 1,000,000 lines per second, and the positioning stage may move the substrate with a velocity in a range from 100 μm/second to 1,000 mm/second.

While the substrate is in motion, in step 504 a servo mechanism changes the angle of a scan mirror such that an image of the substrate (or a portion thereof) that is acquired by the objective lens component, is kept still with respect to the camera. In some aspects, a computing device that is part of, or coupled to, the sequencing machine executes logic that controls the servo mechanism in coordination with the positioning stage. For example, the logic receives feedback control information that represents the movement of the positioning stage and uses this information to adjust the input signal to the servo mechanism, which in turn changes the angle of the scan mirror thereby synchronizing the motion of the scan mirror with the motion of the positioning stage. In some aspect, the logic also receives feedback angle information from an angle sensor that detects whether there are any nonlinearities in the motion of the scan mirror itself. The logic then uses this angle information to compute offset corrections and passes the offset corrections as an input signal to a servo mechanism that controls the angle of a tilt plate in the optical path between the scan mirror and the camera. In this manner, by making minor adjustments to the angle of the tilt plate, the logic effectively removes from the image being acquired any errors that are caused by nonlinearities in the motion of the scan mirror.

In step 506, the camera records the still image of the substrate (or a portion thereof) while the substrate is being moved by the positioning stage. In some aspects, while the camera is recording the image in a set of pixel rows in its sensor, image data from other previously exposed pixel rows is read out from the camera. For example, a computing device that is part of, or coupled to, the sequencing machine executes logic that reads out rows of pixels that have already being exposed and are currently not acquiring any more light. In this manner, extraction of image data from one portion of the sensor of the camera proceeds concurrently with acquisition of another image in a different portion of the sensor, thereby increasing the efficiency of the camera readout and therefore the overall throughput of the imaging system. For instance, in some aspects the camera can operate with readout efficiency in the range between 10% and 55%.

Sequencing Systems and Computing Devices

Figure 6A:
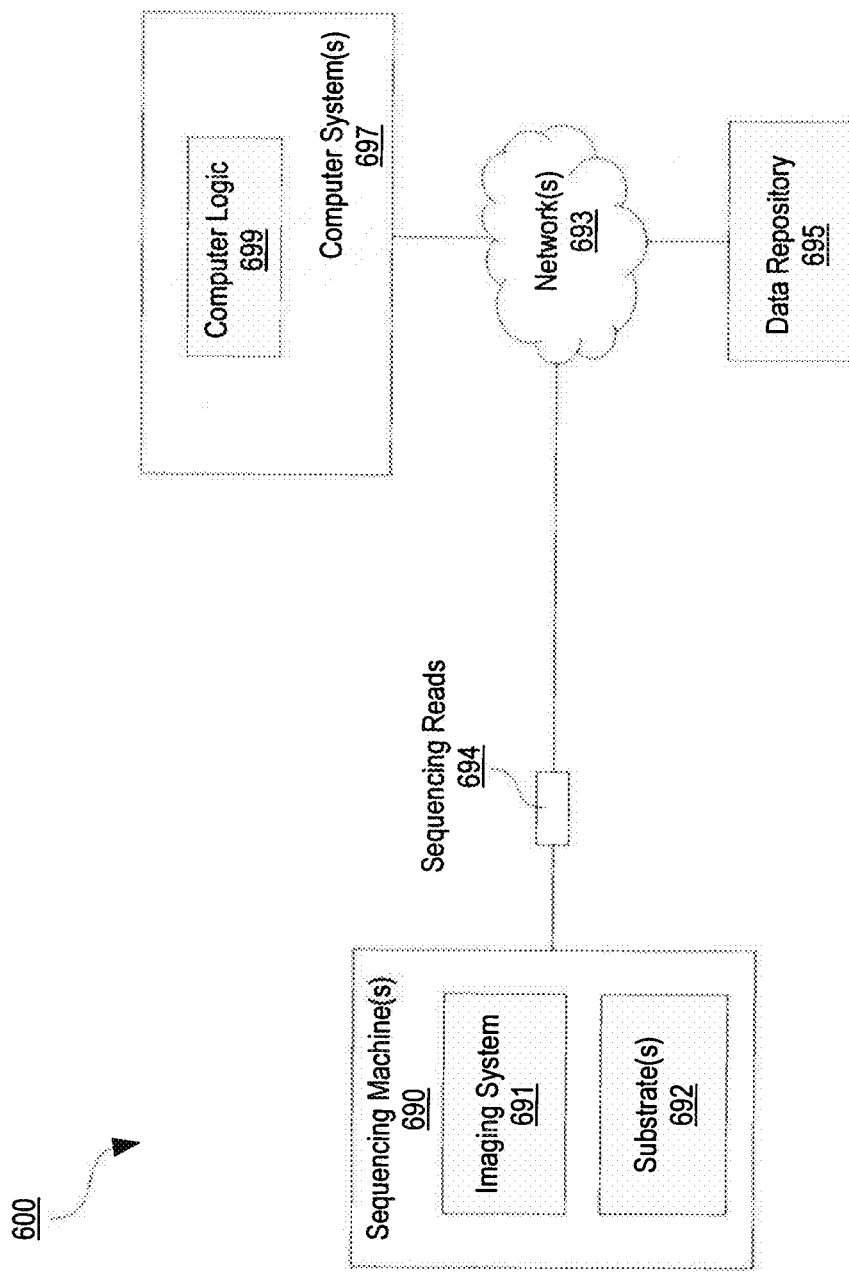
FIGS. 6A and 6B illustrate example sequencing systems.
Figure 6B:
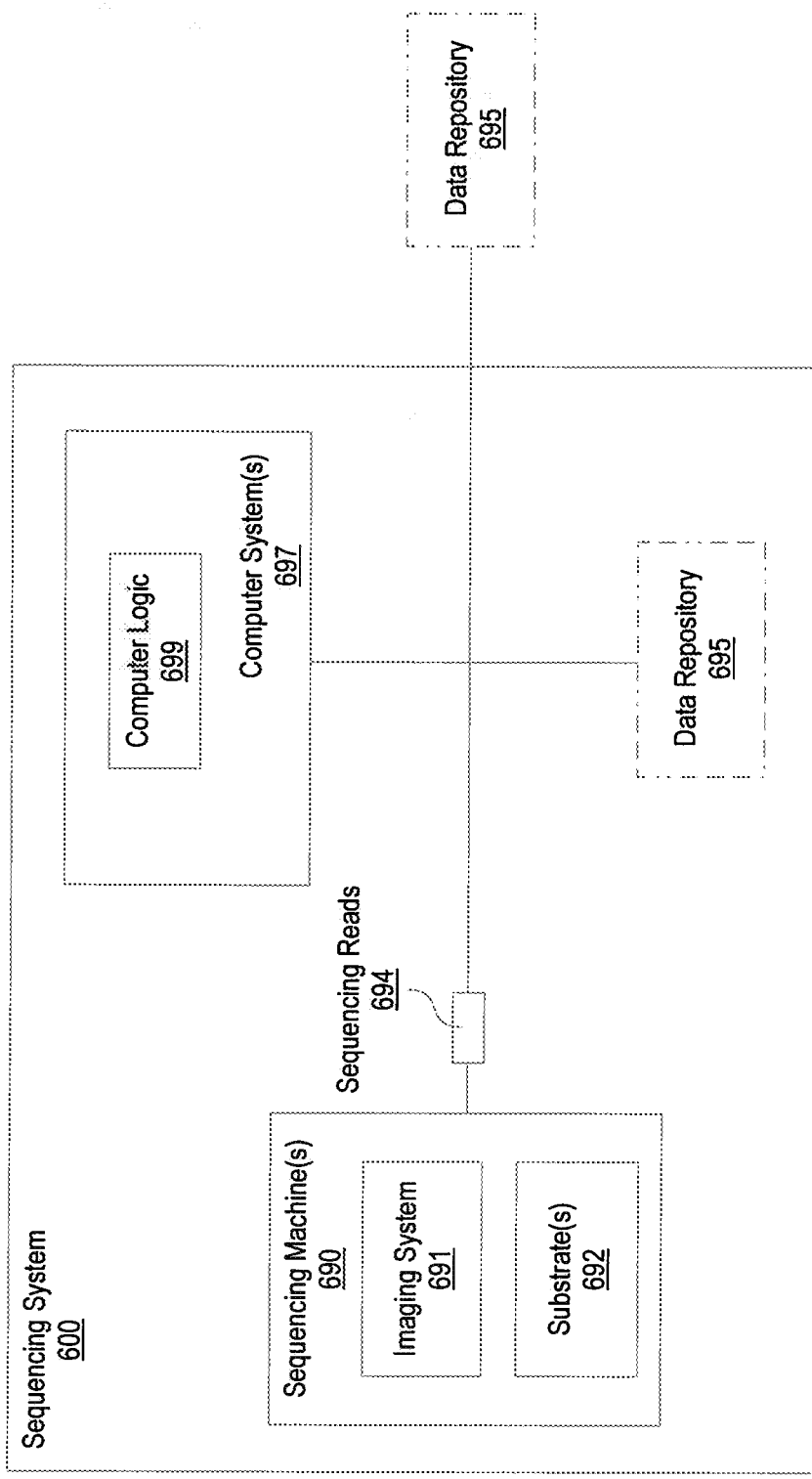

In some embodiments, sequencing of DNA samples (e.g., such as samples representing whole human genomes or samples representing exomes) may be performed by a sequencing system. FIGS. 6A and 6B illustrate example sequencing systems.

FIGS. 6A and 6B are block diagrams of example sequencing systems 600 that are configured to perform DNA sequencing according to the example embodiments described herein. A sequencing system 600 can include multiple subsystems such as, for example, one or more sequencing machines such as sequencing machine 690, one or more computer systems such as computer system 697, and one or more data repositories such as data repository 695. In the embodiment illustrated in FIG. 6A, the various subsystems of system 600 may be communicatively connected over one or more networks 693, which may include packet-switching or other types of network infrastructure devices (e.g., routers, switches, etc.) that are configured to facilitate information exchange between remote systems. In the embodiment illustrated in FIG. 6B, sequencing system 600 is a sequencing device in which the various subsystems (e.g., such as sequencing machine(s) 690, computer system(s) 697, and possibly data repository 695) are components that are communicatively and operatively coupled and integrated within the sequencing device.

In some operational contexts, data repository 695 and/or computer system(s) 697 of the embodiments illustrated in FIGS. 6A and 6B may be configured within a cloud computing environment. In a cloud computing environment, the storage devices comprising a data repository and/or the computing devices comprising a computer system may be allocated and instantiated for use as a utility and on-demand; thus, the cloud computing environment provides as services the infrastructure (e.g., physical and virtual machines, raw/block storage, firewalls, load-balancers, aggregators, networks, storage clusters, etc.), the platforms (e.g., a computing device and/or a solution stack that may include an operating system, a programming language execution environment, a database server, a web server, an application server, etc.), and the software (e.g., applications, application programming interfaces or APIs, etc.) necessary to perform any storage-related and/or computing tasks.

It is noted that in various embodiments, the techniques described herein can be performed by various systems and devices that include some or all of the above subsystems and components (e.g., such as sequencing machines, computer systems, and data repositories) in various configurations and form factors; thus, the example embodiments and configurations illustrated in FIGS. 6A and 6B are to be regarded in an illustrative rather than a restrictive sense.

A sequencing machine is configured and operative to receive one or more substrates that include target nucleic acids derived from fragments of a biological sample, and to perform sequencing on the target nucleic acids. Any suitable machine that can perform sequencing may be used, where such machine may use various sequencing techniques that include, without limitation, sequencing by hybridization, sequencing by ligation, sequencing by synthesis, single-molecule sequencing, and any other now-known or later-developed technique that is suitable for generating sequencing reads from DNA by using an imaging system as described herein. In various embodiments, a sequencing machine can sequence the target nucleic acids and can generate sequencing reads that may or may not include gaps and that may or may not be mate-pair (e.g., paired-end) reads. As illustrated in FIGS. 6A and 6B, sequencing machine 690 sequences the target nucleic acids that are on substrate(s) 692 and obtains sequencing reads 694, which are transmitted for (temporary and/or persistent) storage to data repository 695 and/or for processing by one or more computer systems 697. In accordance with the techniques described herein, sequencing machine 690 includes an imaging system 691 such as, for example, the imaging system illustrated in FIG. 1.

Referring to FIGS. 6A and 6B, data repository 695 may be implemented on one or more storage devices (e.g., hard disk drives, optical disks, solid-state drives, etc.) that may be configured as an array of disks (e.g., such as a SCSI array), a storage cluster, or any other suitable storage organization. The storage device(s) of a data repository can be configured as internal/integral components of system 600 or as external components (e.g., such as external hard drives or disk arrays) attachable to system 600 (e.g., as illustrated in FIG. 6B), and/or may be communicatively interconnected in a suitable manner such as, for example, a grid, a storage cluster, a storage area network (SAN), and/or a network attached storage (NAS) (e.g., such as illustrated in FIG. 6A). In various embodiments and implementations, a data repository may be implemented on the storage devices as one or more file systems that store information as files, as one or more databases that store information in data records, and/or as any other suitable data storage organization.

Computer system 697 may include one or more computing devices that comprise general purpose processors (e.g., Central Processing Units, or CPUs), memory, and computer logic 699 which, along with configuration data and/or operating system (OS) software, can perform some or all of the techniques and methods described herein. For example, any of the methods involved in imaging (e.g., such as image position correction, servo rotation control, scan mirror rotation and control, chip-positioning stage movement and synchronization, feedback control, image data readout, etc.) described herein can be totally or partially performed by a computing device including a processor that can be configured to execute logic 699 for performing various steps of the methods. Further, although method steps may be presented as numbered steps, it is understood that steps of the methods described herein can be performed at the same time (e.g., by logic executing in parallel on the same computing device or in a cluster of computing devices) or in a different order. The functionalities of computer logic 699 may be implemented as a single integrated module (e.g., in an integrated logic) or may be combined in two or more software modules that may provide some additional functionalities.

In some embodiments, computer system 697 may be a single computing device. In other embodiments, computer system 697 may comprise multiple computing devices that may be communicatively and/or operatively interconnected in a grid, a cluster, or in a cloud computing environment. Such multiple computing devices may be configured in different form factors such as computing nodes, blades, or any other suitable hardware configuration. For these reasons, computer system 697 in FIGS. 6A and 6B is to be regarded in an illustrative rather than a restrictive sense.

Figure 7:
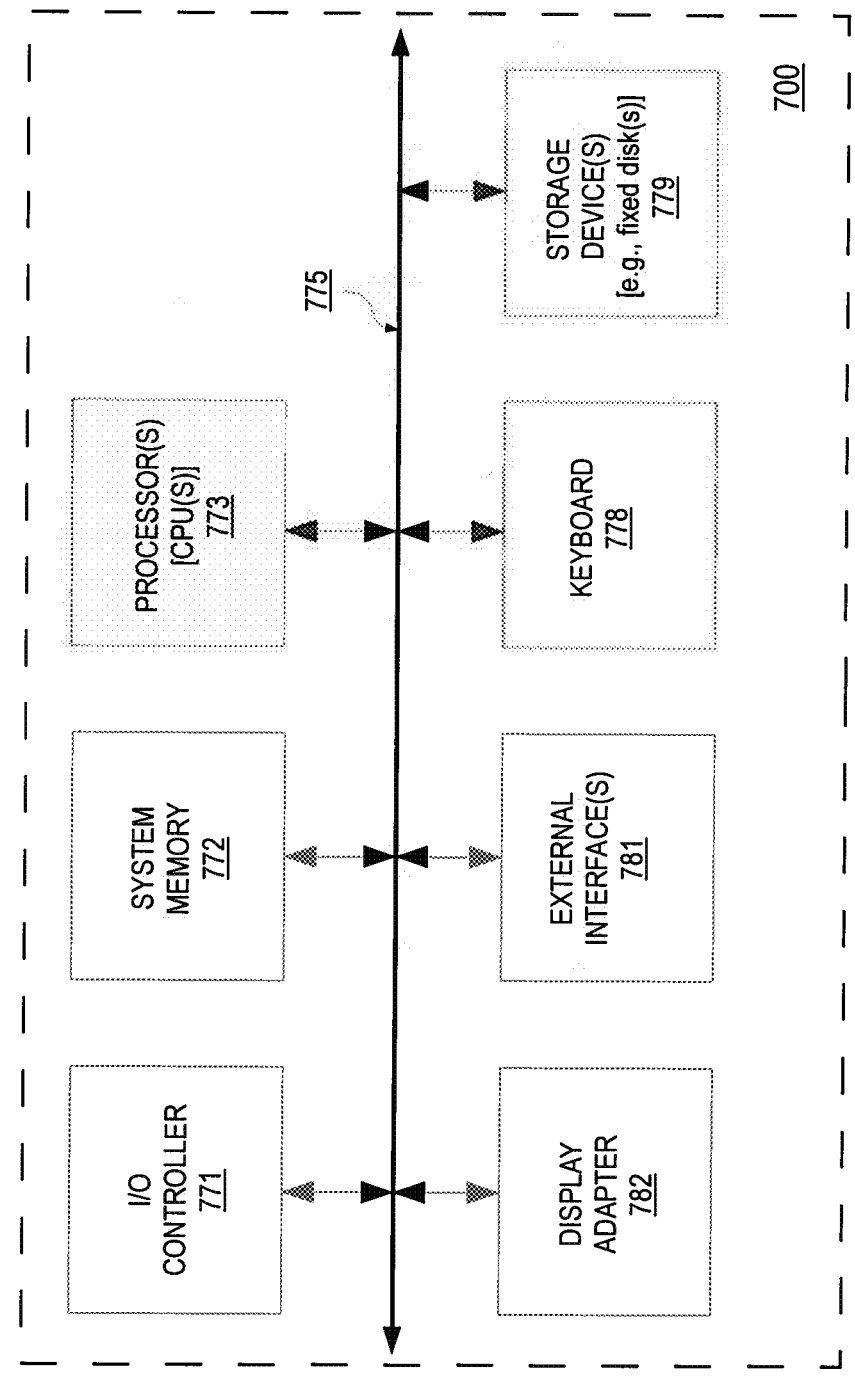
FIG. 7 illustrates an example computing device that can be used in, or in conjunction with, a sequencing machine and/or a computer system.

FIG. 7 is a block diagram of an example computing device 700 that can be configured to execute instructions for performing various methods involved in imaging as part of sequencing machine(s) and/or computer system(s).

In FIG. 7, computing device 700 comprises several components that are interconnected directly or indirectly via one or more system buses such as bus 775. Such components may include, but are not limited to, keyboard 778, persistent storage device(s) 779 (e.g., such as fixed disks, solid-state disks, optical disks, and the like), and display adapter 782 to which one or more display devices (e.g., such as LCD monitors, flat-panel monitors, plasma screens, and the like) can be coupled. Peripherals and input/output (I/O) devices, which couple to I/O controller 771, can be connected to computing device 700 by any number of means known in the art including, but not limited to, one or more serial ports, one or more parallel ports, and one or more universal serial buses (USBs). External interface(s) 781 (which may include a network interface card and/or serial ports) can be used to connect computing device 700 to a network (e.g., such as the Internet or a local area network (LAN)) and/or to other machines and devices. External interface(s) 781 may also include a number of input interfaces that can receive information from various external devices. The interconnection via system bus 775 allows one or more processors (e.g., CPUs) 773 to communicate with each connected component and to execute (and control the execution of) instructions from system memory 772 and/or from storage device(s) 779, as well as the exchange of information between various components. System memory 772 and/or storage device(s) 779 may be embodied as one or more computer-readable non-transitory storage media that store the sequences of instructions executed by processor(s) 773, as well as other data. Such computer-readable non-transitory storage media include, but is not limited to, random access memory (RAM), read-only memory (ROM), an electro-magnetic medium (e.g., such as a hard disk drive, solid-state drive, thumb drive, floppy disk, etc.), an optical medium such as a compact disk (CD) or digital versatile disk (DVD), flash memory, and the like. Various data values and other structured or unstructured information can be output from one component or subsystem to another component or subsystem, can be presented to a user via display adapter 782 and a suitable display device, can be sent through external interface(s) 781 over a network to a remote device or a remote data repository, or can be (temporarily and/or permanently) stored on storage device(s) 779.

It should be understood that any of the methods and functionalities performed by computing device 700 can be implemented in the form of logic using hardware and/or computer software in a modular or integrated manner. When executed, such logic is adapted to perform the various methods involved in imaging (e.g., such as image position correction, servo rotation control, scan mirror rotation and control, chip-positioning stage movement and synchronization, feedback control, image data readout, etc.) as described herein.

Sequence Determination

The imaging systems described herein may be used for a variety of biochemical analyses. One example of such analysis is sequence determination of target nucleic acids of unknown sequence. In various embodiments, a variety of sequencing methodologies may be used to determine a sequence of the nucleic acid macromolecules using the imaging systems described herein, including, but not limited to: hybridization methods (e.g., as disclosed in U.S. Pat. Nos. 6,864,052; 6,309,824; and 6,401,267); sequencing-by-synthesis methods (e.g., as disclosed in U.S. Pat. Nos. 6,210,891; 6,828,100, 6,833,246; 6,911,345; Margulies, et al. (2005), Nature 437:376-380; and Ronaghi, et al. (1996), Anal. Biochem. 242:84-89); and ligation-based methods (e.g., such as disclosed in U.S. Pat. No. 6,306,597; and Shendure et al. (2005), Science 309:1728-1739); to which reference is made for their teachings.

In some embodiments, fluorescent signals emitted from target nucleic acids disposed on a substrate (e.g., such as an array chip) are recorded by imaging them onto sensor arrays of a camera in accordance with the techniques described herein. For example, in some imaging systems, each pixel in a sensor array records the results of a separate fluorescence experiment, while in other imaging systems more than one pixel is used per experiment.

Generally, biochemical substrates allow millions of biochemical experiments to be performed in parallel. This ability accrues from the development of techniques to perform each experiment in a very small volume and to pack the experiments very close together. For example, in some embodiments a large number of attachment sites may be configured on an array chip in regular or random patterns, where the number of attachment sites may preferably be in a range from 5 billion to 50 billion, and more preferably in a range from 10 billion to 15 billion, and more generally in any sub-ranges in-between; in embodiments that use regular patterns, the pitch between the centers of any two adjacent attachment sites may be in a range from 250 nm to 1.5 μm. In operation, when macromolecules or other target nucleic acids are disposed on the attachment sites, various embodiments preferably provide single-molecule occupancy at 60% to 95% of the attachment sites; further, the yield (e.g., the average number of macromolecules or target nucleic acids that emit a signal at any given imagining run) in various embodiments may preferably be in a range from 35% to 65% of all attachment sites that hold macromolecules or target nucleic acids.

In some embodiments, DNA sequencing includes chemical processing of DNA samples, physical analysis of the processed samples to obtain raw sequence fragments, and assembly of the sequence fragments into complete genomes using computational algorithms. In some methods for DNA sequencing multiple chemical processing and physical analysis cycles may be used to build up raw sequence data before computational work begins.

In such embodiments, fluorescence imaging is used to identify DNA bases—A, C, G, or T—by designing biochemical reactions such that a different colored dye (for example, red, green, blue, or yellow) corresponds to each one. Images of such DNA experiments for each color may then be taken through an objective lens component (e.g., such as a microscope objective). The colors observed indicate the DNA bases at a particular chemical processing step. Extracting data from such images thus depends on recording the color of fluorescence emitted by many millions or even billions of biochemical experiments that are conducted on a substrate (e.g., such as a chip).

In some embodiments, the imaging systems described herein may be used for DNA sequencing of whole human genomes such as, for example, genomes of human individuals. Commercial viability of human genome sequencing depends in part on the ability to sequence DNA rapidly and accurately. The imaging systems described herein satisfy these criteria because they support processing of large numbers of parallel DNA experiments (e.g., that are being disposed at high density on an array chip), and can facilitate rapid and accurate genomic data acquisition.

While the present invention is satisfied by embodiments in many different forms, as described in detail in connection with preferred embodiments of the invention, it is understood that the present disclosure is to be considered as exemplary of the principles of the invention and is not intended to limit the invention to the specific embodiments illustrated and described herein. Numerous variations may be made by persons skilled in the art without departure from the spirit of the invention. The scope of the invention will be measured by the claims and their equivalents that issue from the present application. The abstract and the title are not to be construed as limiting the scope of the present invention, as their purpose is to enable the appropriate authorities, as well as the general public, to quickly determine the general nature of the invention. In the claims that follow, unless the term "means" is used, none of the features or elements recited therein should be construed as means-plus-function limitations pursuant to 35 U.S.C. §112, ¶6.

Example Sequencing Platform

One example of DNA sequencing of human genomes is the high-accuracy, combinatorial probe-anchor ligation (cPAL) sequencing that is commercially developed by Complete Genomics, Inc. of Mountain View, Calif. The cPAL sequencing technique relies on independently assaying each base from self-assembling DNA nanoballs ("DNBs") that are loaded into patterned arrays on array chips. The first step in cPAL sequencing is loading a biochemical array chip with a random assortment of DNBs. A DNB is a concatemer that contains multiple copies, linked in a series, of the same sequence of adapters and DNA fragments that represent target nucleic acid(s); the production of such concatemers is described, for example, in U.S. patent application Ser. No. 11/451,691, which was filed on Jun. 13, 2006 by Radoje Drmanac et al., the entire content of which is hereby incorporated by reference is fully set forth herein. A set of DNBs contains DNA fragments that can collectively span an entire human genome, but when the DNBs are first attached to the attachment sites on an array chip there is no control over where any particular DNB goes. On the other hand, once the DNBs have attached to the attachment sites, they stay there for all subsequent liquid processing steps and don't move from one site to another. In subsequent processing steps various reagents and buffers are washed over the DNBs on the array chip, and fluorescent signals from the DNBs are recorded with a fluorescence imaging system.

More specifically, the cPAL sequencing technique comprises cycling of the following steps. First, an anchor is hybridized to a first adaptor in the DNBs (typically immediately at the 5' or 3' end of one of the adaptors). Enzymatic ligation reactions are then performed with the anchor to a fully degenerate probe population of, e.g., 8-mer probes, that are labeled, e.g., with fluorescent dyes. Probes may have a length, e.g., about 6-20 bases, or, preferably, about 7-12 bases. At any given cycle, the population of 8-mer probes that is used is structured such that the identity of one or more of its positions is correlated with the identity of the fluorophore attached to that 8-mer probe. For example, when 7-mer sequencing probes are employed, a set of fluorophore-labeled probes for identifying a base immediately adjacent to an adaptor may have the following structure: 3'-F1-NNNNNNAp, 3'-F2-NNNNNNGp, 3'-F3-NNNNNNCp, and 3'-F4-NNNNNNTp (where "p" is a phosphate available for ligation). In yet another example, a set of fluorophore-labeled 7-mer probes for identifying a base that is three bases into a target nucleic acid from an adaptor may have the following structure: 3'-F1-NNNNANNp, 3'-F2-NNNNGNNp, 3'-F3-NNNNCNNp, and 3'-F4-NNNNTNNp. (It is to be understood that these are not genome sequences to be catalogued, but are merely examples of structure for illustrative purposes.) To the extent that the ligase discriminates for complementarity at that queried position, the fluorescent signal provides the identity of that base.

After performing the ligation and four-color imaging, the anchor 8-mer probe complexes are stripped and a new cycle is begun. With T4 DNA ligase, accurate sequence information can be obtained as far as six bases or more from the ligation junction, allowing access to at least 12 base-pairs (bp) per adaptor (six bases from both the 5' and 3' ends), for a total of 48 bp per 4-adaptor DNB, 60 bp per 5-adaptor DNB, and so on.

Depending on which position a given cycle is aiming to interrogate, the 8-mer probes are structured differently. Specifically, a single position within each 8-mer probe is correlated with the identity of the fluorophore with which it is labeled. Additionally, the fluorophore molecule is attached to the opposite end of the 8-mer probe relative to the end targeted to the ligation junction. For example, an anchor may be hybridized such that its 3' end is adjacent to the target nucleic acid. To query a position five bases into the target nucleic acid, a population of degenerate 8-mer probes may be used, where the probes correlate with the fifth nucleic acid from the 5' end of the 8-mer probe, which is the end of the 8-mer probe that will ligate to the anchor. The 8-mer probes are individually labeled with one of four fluorophores, where a fluorophore of Cy5 is correlated with A, Cy3 is correlated with G, Texas Red is correlated with C, and FITC is correlated with T. (While this example describes use of four fluorophores to query a single base per cycle, it should be recognized that eight or sixteen fluorophores or more may be used per cycle, increasing the number of bases that can be identified during any one cycle.)

Many different variations of cPAL or other sequencing-by-ligation approaches may be selected depending on various factors such as the volume of sequencing desired, the type of labels employed, the number of different adaptors used within each library construct, the number of bases being queried per cycle, how the DNBs are attached to the surface of the array, the desired speed of sequencing operations, signal detection approaches, and the like.

The degenerate (e.g., 8-mer) probes can be labeled in a variety of ways, including the direct or indirect attachment of radioactive moieties, fluorescent moieties, colorimetric moieties, chemiluminescent moieties, and the like. Many comprehensive reviews of methodologies for labeling DNA and constructing DNA adaptors provide guidance applicable to constructing oligonucleotide probes of the present invention. Such reviews include Kricka (2002), Ann. Clin. Biochem., 39: 114-129, and Haugland (2006); Handbook of Fluorescent Probes and Research Chemicals, 10th Ed. (Invitrogen/Molecular Probes, Inc., Eugene); Keller and Manak (1993), DNA Probes, 2nd Ed. (Stockton Press, New York, 1993); and Eckstein (1991), Ed., Oligonucleotides and Analogues: A Practical Approach (IRL Press, Oxford); and the like.

In one aspect, one or more fluorescent dyes are used as labels for the oligonucleotide probes. Labeling can also be carried out with quantum dots, as disclosed in the following U.S. patents and U.S. patent publications, incorporated herein by reference: U.S. Pat. Nos. 6,322,901; 6,576,291; 6,423,551; 6,251,303; 6,319,426; 6,426,513; 6,444,143; 5,990,479; 6,207,392; 2002/0045045; 2003/0017264; and the like. Commercially available fluorescent nucleotide analogues readily incorporated into the degenerate probes include, for example, Cascade Blue, Cascade Yellow, Dansyl, lissamine rhodamine B, Marina Blue, Oregon Green 488, Oregon Green 514, Pacific Blue, rhodamine 6G, rhodamine green, rhodamine red, tetramethylrhodamine, Texas Red, the Cy fluorophores, the Alexa Fluor® fluorophores, the BODIPY® fluorophores and the like. FRET tandem fluorophores may also be used. Other suitable labels for detection oligonucleotides may include fluorescein (FAM), digoxigenin, dinitrophenol (DNP), dansyl, biotin, bromodeoxyuridine (BrdU), hexahistidine (6×His), phosphor-amino acids (e.g. P-tyr, P-ser, P-thr) or any other suitable label.

Image acquisition of such sequencing cycles can be performed by sequencing systems that include the imaging systems described herein. Data extraction may be performed by computing device(s) that execute(s) a series of binaries compiled from source code written in a programming language (e.g., such as C/C++), and base-calling and read-mapping may be performed by a series of Matlab and/or Perl scripts. For example, according to the example sequencing techniques described above, for each base in a target nucleic acid to be queried (e.g., for 12 bases, reading 6 bases in from both the 5' and 3' ends of each target nucleic acid portion of each DNB), a hybridization reaction, a ligation reaction, imaging, and a primer stripping reaction is performed. To determine the identity of each DNB in an array on a flow device at a given position, after performing the biological sequencing reactions, each field of view ("frame") is imaged with four different wavelengths corresponding to the four fluorescent, e.g., 8-mers used. All images from each cycle are saved in a cycle directory, where the number of images is 4× the number of frames (for example, if a four-fluorophore technique is employed). Cycle image data may then be saved into a directory structure organized for downstream processing.

Data extraction typically requires two types of image data: bright field images to demarcate the positions of all DNBs in the array; and sets of fluorescence images acquired during each sequencing cycle. A computing device executes data extraction software to identify all objects with the brightfield images, then for each such object, to compute an average fluorescence value for each sequencing cycle. For any given cycle, there are four data-points, corresponding to the four images taken at different wavelengths to query whether that base is an A, G, C, or T. These raw base-calls are consolidated, yielding a (possibly discontinuous) sequencing read for each DNB. These sequencing reads may then be matched against a reference genome by using various techniques and algorithms that can be performed on one or more computer systems that include one or more computing devices.

Selected Biochemical Definitions

Various embodiments described herein may use reagents, buffers, and other fluids that are prepared by conventional techniques involving organic chemistry, polymer technology, molecular biology (including recombinant techniques), cell biology, and biochemistry, which are within the skill of those who practice in the art. Such conventional techniques may include, without limitation, polymer array synthesis, hybridization and ligation of polynucleotides, and detection of hybridization using a label. Specific illustrations of suitable techniques can be had by reference to the examples herein. However, other equivalent procedures can, of course, also be used. Such procedures can be found in standard laboratory manuals such as Green, et al., Eds. (1999), Genome Analysis: A Laboratory Manual Series (Vols. I-IV); Weiner, Gabriel, Stephens, Eds. (2007), Genetic Variation: A Laboratory Manual; Dieffenbach, Dveksler, Eds. (2003), PCR Primer: A Laboratory Manual; Bowtell and Sambrook (2003), DNA Microarrays: A Molecular Cloning Manual; Mount (2004), Bioinformatics: Sequence and Genome Analysis; Sambrook and Russell (2006, Condensed Protocols from Molecular Cloning: A Laboratory Manual; and Sambrook and Russell (2002), Molecular Cloning: A Laboratory Manual (all from Cold Spring Harbor Laboratory Press); Stryer, L. (1995) Biochemistry (4th Ed.) W.H. Freeman, New York N.Y.; Gait, "Oligonucleotide Synthesis: A Practical Approach" 1984, IRL Press, London; Nelson and Cox (2000), Lehninger, Principles of Biochemistry 3rd Ed., W. H. Freeman Pub., New York, N.Y.; and Berg et al. (2002) Biochemistry, 5th Ed., W.H. Freeman Pub., New York, N.Y., all of which are herein incorporated in their entirety by reference for all purposes.

"Adaptor" refers to an engineered construct comprising "adaptor elements" where one or more adaptors may be interspersed within target nucleic acid in a library construct. The adaptor elements or features included in any adaptor may vary widely depending on the use of the adaptors, but typically include sites for restriction endonuclease recognition and/or cutting, sites for primer binding (e.g., for amplifying the library constructs) or anchor primer binding (e.g., for sequencing the target nucleic acids in the library constructs), nickase sites, and the like. In some aspects, adaptors are engineered so as to comprise one or more of the following: 1) a length of about 20 to about 250 nucleotides, or about 40 to about 100 oligonucleotides, or less than about 60 nucleotides, or less than about 50 nucleotides; 2) features so as to be ligated to the target nucleic acid as two "arms"; 3) different and distinct anchor binding sites at the 5' and the 3' ends of the adaptor for use in sequencing of adjacent target nucleic acid(s); and 4) one or more restriction sites.

"Amplicon" refers to the product of a polynucleotide amplification reaction. For example, an amplicon may be a population of polynucleotides that are replicated from one or more starting sequences. Amplicons may be produced by a variety of amplification reactions, including but not limited to polymerase chain reactions (PCRs), linear polymerase reactions, nucleic acid sequence-based amplification, circle dependent amplification and like reactions (see, e.g., U.S. Pat. Nos. 4,683,195; 4,965,188; 4,683,202; 4,800,159; 5,210,015; 6,174,670; 5,399,491; 6,287,824 and 5,854,033; and US Pub. No. 2006/0024711).

"Circle dependent amplification" or "CDA" refers to multiple displacement amplification of a double-stranded circular template using primers annealing to both strands of the circular template to generate products representing both strands of the template, resulting in a cascade of multiple-hybridization, primer-extension, and strand-displacement events. This leads to an exponential increase in the number of primer binding sites, with a consequent exponential increase in the amount of product generated over time. The primers used may be of a random sequence (e.g., random hexamers) or may have a specific sequence to select for amplification of a desired product. CDA results in a set of concatemeric double-stranded fragments.

"Circle dependent replication" or "CDR" refers to multiple displacement amplification of a double-stranded circular template using one or more primers annealing to the same strand of the circular template to generate products representing only one strand of the template. In CDR, no additional primer binding sites are generated and the amount of product increases only linearly with time. The primer(s) used may be of a random sequence (e.g., one or more random hexamers) or may have a specific sequence to select for amplification of a desired product. Without further modification of the end product, CDR often results in the creation of a linear construct having multiple copies of a strand of the circular template in tandem, e.g., such as a linear concatemer of multiple copies of a strand of the template.

"Complementary" or "substantially complementary" refers to the hybridization or base pairing or the formation of a duplex between nucleotides or nucleic acids, such as, for instance, between the two strands of a double-stranded DNA molecule or between an oligonucleotide primer and a primer binding site on a single-stranded nucleic acid. Complementary nucleotides are, generally, A and T (or A and U), or C and G. Two single-stranded RNA or DNA molecules are said to be substantially complementary when the nucleotides of one strand, optimally aligned and compared and with appropriate nucleotide insertions or deletions, pair with at least about 80% of the other strand, usually at least about 90% to about 95%, and even about 98% to about 100%.

"Duplex" means at least two oligonucleotides or polynucleotides that are fully or partially complementary and which undergo Watson-Crick type base pairing among all or most of their nucleotides so that a stable complex is formed. The terms "annealing" and "hybridization" are used interchangeably to mean formation of a stable duplex. "Perfectly matched" in reference to a duplex means that the poly- or oligonucleotide strands making up the duplex form a double-stranded structure with one another such that every nucleotide in each strand undergoes Watson-Crick base pairing with a nucleotide in the other strand. A "mismatch" in a duplex between two oligonucleotides or polynucleotides means that a pair of nucleotides in the duplex fails to undergo Watson-Crick base pairing.

"Fluorophore" refers to a molecule comprising or consisting of a functional group that absorbs energy within a specific absorption spectrum and re-emits energy at a different (but equally specific) emission spectrum. Preferred fluorophores for use as markers include, but are not limited to, fluorescein, cascade blue, hexachloro-fluorescein, tetrachloro-fluorescein, TAN/IRA, ROX, FAM, Cy3, Cy3.5, Cy5, Cy5.5, 4,4-difluoro-5,7-diphenyl-4-bora-3a,4a-diaza-s-indacene-3-propionic acid, 4,4-difluoro-5,p-methoxyphenyl-4-bora-3a,4a-diaza-s-indacene-3-propionic acid, 4,4-difluoro-5-styryl-4-bora-3a,4-adiaz-a-S-indacene-propionic acid, 6-carboxy-X-rhodamine, N,N,N',N'-tetramethyl-6-carboxyrhodamine, Texas Red, Eosin, 4,4-difluoro-5,7-diphenyl-4-bora-3a,4a-diaza-s-indacene-3-propionic acid, 4,4-difluoro-5,p-ethoxyphenyl-4-bora-3a,4a-diaza-s-indacene 3-propionic acid and 4,4-difluoro-5-styryl-4-bora-3a,4a-diaza-S-indacene-ptopionic acid, the DyLight Fluor family available from Thermo Fisher Scientific of Waltham, Mass. and the Alexa Fluor family from Molecular Probes of Eugene, Oreg.

"Hybridization" refers to the process in which two single-stranded polynucleotides bind non-covalently to form a stable double-stranded polynucleotide. The resulting (and usually) double-stranded polynucleotide is a "hybrid" or "duplex." "Hybridization conditions" will typically include salt concentrations of less than about 1 M, more typically less than about 500 mM and may be less than about 200 mM. A "hybridization buffer" is a buffered salt solution such as 5% SSPE, or other such buffers known in the art. Hybridization temperatures can be as low as 5° C., but are typically greater than 22° C., and more typically greater than about 30° C., and typically in excess of 37° C. Hybridizations are usually performed under stringent conditions, e.g., conditions under which a probe will hybridize to its target subsequence but will not hybridize to the other, uncomplimentary sequences. Stringent conditions are sequence-dependent and are different in different circumstances. For example, longer fragments may require higher hybridization temperatures for specific hybridization than short fragments. As other factors may affect the stringency of hybridization, including base composition and length of the complementary strands, presence of organic solvents, and the extent of base mismatching, the combination of parameters is more important than the absolute measure of any one parameter alone. Generally stringent conditions are selected to be about 5° C. lower than the $T_m$ for the specific sequence at a defined ionic strength and pH. Exemplary stringent conditions include a salt concentration of at least 0.01 M to no more than 1 M sodium ion concentration (or other salt) at a pH of about 7.0 to about 8.3 and a temperature of at least 25° C. For example, conditions of 5×SSPE (750 mM NaCl, 50 mM sodium phosphate, 5 mM EDTA at pH 7.4) and a temperature of 30° C. are suitable for allele-specific probe hybridizations.

"Ligation" refers to the process of forming a covalent bond or linkage between the termini of two or more nucleic acids, e.g., oligonucleotides and/or polynucleotides, in a template-driven reaction. The nature of the bond or linkage may vary widely and the ligation may be carried out enzymatically or chemically. As used herein, ligations are usually carried out enzymatically to form a phosphodiester linkage between a 5' carbon terminal nucleotide of one oligonucleotide with a 3' carbon of another nucleotide. Template driven ligation reactions are described in the following references: U.S. Pat. Nos. 4,883,750; 5,476,930; 5,593,826; and 5,871,921.

"Polynucleotide", "nucleic acid", "oligonucleotide", "oligo" or grammatical equivalents used herein, refer generally to at least two nucleotides that are covalently linked together. A nucleotide is composed of a nucleobase (or just "base"), a five-carbon sugar (e.g., such as a ribose or 2'-deoxyribose), and one to three phosphate groups that form the backbone of the nucleotide. Together, the base (e.g., one of the four main nucleotide bases of C, G, A, T, and the base U found in RNA) and the sugar comprise a nucleoside. A polynucleotide generally contains phosphodiester bonds, although in some cases nucleic acid analogs may be included that have alternative backbones such as, for example: phosphoramidite, phosphorodithioate, or methylphophoroamidite linkages; and peptide nucleic acid backbones and linkages. Other analog nucleic acids include those with bicyclic structures including locked nucleic acids, positive backbones, non-ionic backbones, and non-ribose backbones.

"Primer" refers to an oligonucleotide, either natural or synthetic, which is capable, upon forming a duplex with a polynucleotide template, of acting as a point of initiation of nucleic acid synthesis and being extended from one of its ends along the template so that an extended duplex is formed. The sequence of nucleotides added during the extension process is determined by the sequence of the template polynucleotide. Primers usually are extended by a DNA polymerase.

"$T_m$" is a term commonly defined as the temperature at which half of the population of double-stranded nucleic acid molecules becomes dissociated into single strands. The equation for calculating the $T_m$ of nucleic acids is well known in the art. As indicated by standard references, a simple estimate of the $T_m$ value may be calculated by the equation: $T_m=81.5+16.6(\log 10[Na+])0.41(\%[G+C])-675/n-1.0$ m, when a nucleic acid is in aqueous solution having cation concentrations of 0.5 M, or less, the (G+C) content is between 30% and 70%, "n" is the number of bases, and "m" is the percentage of base pair mismatches (see e.g., Sambrook J et al., "Molecular Cloning, A Laboratory Manual", 3rd Edition, Cold Spring Harbor Laboratory Press (2001)). Other references include more sophisticated computations, which take structural as well as sequence characteristics into account for the calculation of $T_m$ (see also, Anderson and Young (1985), Quantitative Filter Hybridization, Nucleic Acid Hybridization, and Allawi and SantaLucia (1997), Biochemistry 36:10581-94).

The invention has been explained with reference to specific embodiments. Other embodiments will be apparent to those of ordinary skill in the art upon reference to this disclosure. It is therefore not intended that this invention be limited, except as indicated by the appended claims.

What is claimed is:

1. An imaging system comprising:
    a camera with a two dimensional full-frame electronic sensor, wherein the camera is selected from the group consisting of a CMOS camera, an sCMOS camera, and a non-CMOS camera operating in full-frame mode;
    an objective lens component configured to project an image of at least a portion of a substrate onto the two dimensional full-frame electronic sensor of the camera to produce a two-dimensional image;
    a positioning stage configured to move in continuous motion the substrate in a first direction with respect to the objective lens component while the camera with the two dimensional full-frame electronic sensor produces a two-dimensional image;
    a scan mirror configured to tilt in continuous motion in coordination with the moving positioning stage, while the positioning stage moves the substrate in the first direction, in order to reflect light from the objective lens component to the camera while maintaining the substrate image stable at the two-dimensional full-frame electronic sensor;
    a first tilt plate positioned in an optical path between the scan mirror and the camera, wherein the first tilt plate is configured to cause a first offset correction to the substrate image that is acquired by the objective lens component; and
    a second tilt plate positioned in the optical path between the scan mirror and the camera, wherein the second tilt plate is configured to cause a second offset correction to the substrate image in a direction that is perpendicular to the first offset correction.

2. The system of claim 1 further comprising a tube lens component positioned in an optical path between the scan mirror and the camera, wherein the scan mirror is configured to direct light from the objective lens component through the tube lens component to the two-dimensional full-frame electronic sensor of the camera.

3. The system of claim 1 further comprising a light source and a dichroic mirror, wherein the dichroic mirror is configured at least to: (a) reflect light from the light source to illuminate the substrate; and (b) pass through light that is acquired by the objective lens component.

4. The system of claim 1 wherein movement of the positioning stage and the scan mirror are made by a servo mechanism.

5. The system of claim 1, wherein the camera is a CMOS camera.

6. A method for imaging at least a portion of a substrate, the method comprising:
    moving a positioning stage carrying nucleic acid targets on the substrate under an objective lens component in a first known lateral direction;
    while the positioning stage carrying the substrate is moving,
        changing an angle of a scan mirror in continuous motion in coordination with the moving positioning stage to track the substrate such that a substrate image that is acquired by the objective lens component is maintained still with respect to a two-dimensional electronic sensor of a camera selected from the group consisting of a CMOS camera, an sCMOS camera, and a non-CMOS camera operating in full-frame mode;

tilting a first optical plate disposed in an optical path between the scan mirror and the two-dimensional full-frame electronic sensor of the camera, to make a first offset correction in the substrate image;

tilting a second optical plate disposed in the optical path between the scan mirror and the two-dimensional full-frame electronic sensor of the camera to make a second offset correction in the substrate image that is perpendicular to the first offset correction; and recording the substrate image through the two-dimensional electronic sensor while the positioning stage carrying the substrate is moving.

7. The method of claim 6, further comprising:

measuring the angle of the scan mirror by using an angle sensor; and using measurement from the angle sensor in changing the angle of the scan mirror.

8. The method of claim 6, further comprising:

measuring the angle of the scan mirror to detect whether there are any nonlinearities in the motion of the scan mirror; and using the offset corrections to remove from the substrate image any nonlinearities that are detected in the motion of the scan mirror.

9. The method of claim 6, wherein the camera is a CMOS camera.

10. An imaging system comprising:

an objective lens component that projects an image of an array chip containing biochemical materials onto a two-dimensional full-frame electronic sensor of a camera selected from the group consisting of a CMOS camera, an sCMOS camera, and a non-CMOS camera operating in full-frame mode;

a scan mirror, capable of angular motion, that reflects light from the objective lens component to the two-dimensional full-frame electronic sensor;

a positioning stage that continuously moves the array chip in a known lateral direction with respect to the objective lens component and in coordination with the scan mirror for maintaining a stable image of the array chip at the two-dimensional full-frame electronic sensor during continuous movement of the positioning stage while the camera projects the image of the array chip;

a first tilt plate positioned in an optical path between the scan mirror and the camera, wherein the first tilt plate is configured to cause a first offset correction to the image of the array chip; and a second tilt plate positioned in the optical path between the scan mirror and the camera, wherein the second tilt plate is configured to cause a second offset correction to the image of the array chip in a direction that is perpendicular to the first offset correction.

11. The system of claim 10, wherein the array chip has DNA macromolecules disposed thereon and the camera is a CMOS camera.

12. The system of claim 10 further comprising a tube lens component, wherein the scan mirror is configured to direct light from the objective lens component through the tube lens component to the two-dimensional full-frame electronic sensor.

13. The system of claim 10 further comprising an angle sensor that measures an angle of the scan mirror.

14. The system of claim 13, wherein the angle sensor comprises an optical lever.

15. The system of claim 13, wherein the angle sensor comprises a laser and a linear array detector that detects light from the laser that is reflected by the scan mirror.

16. The system of claim 12 further comprising an illumination light source and a dichroic mirror disposed to illuminate the array chip while passing the array chip image to the two-dimensional full-frame electronic sensor.

* * * * *